US011939217B2

(12) United States Patent
Takizawa et al.

(10) Patent No.: US 11,939,217 B2
(45) Date of Patent: Mar. 26, 2024

(54) HYDROGEN GENERATION SYSTEM, POWER GENERATION SYSTEM, HYDROGEN GENERATION METHOD, AND POWER GENERATION METHOD

(71) Applicant: SE CORPORATION, Tokyo (JP)

(72) Inventors: Tsutomu Takizawa, Tokyo (JP); Toshihiro Oishi, Tokyo (JP); Yoshiharu Sawaki, Tokyo (JP); Mineo Morimoto, Tokyo (JP); Yuichi Sakamoto, Tachikawa (JP)

(73) Assignee: SE CORPORATION, Tokyo (JP)

( * ) Notice: Subject to any disclaimer, the term of this patent is extended or adjusted under 35 U.S.C. 154(b) by 612 days.

(21) Appl. No.: 17/151,048

(22) Filed: Jan. 15, 2021

(65) Prior Publication Data

US 2021/0139324 A1   May 13, 2021

Related U.S. Application Data

(63) Continuation of application No. PCT/JP2019/044750, filed on Nov. 14, 2019.

(30) Foreign Application Priority Data

Nov. 26, 2018 (JP) ................. 2018-220782

(51) Int. Cl.
*C01B 3/10* (2006.01)
*B01D 53/68* (2006.01)
(Continued)

(52) U.S. Cl.
CPC ............ *C01B 3/105* (2013.01); *B01D 53/68* (2013.01); *B01D 53/76* (2013.01); *B01J 19/08* (2013.01);
(Continued)

(58) Field of Classification Search
CPC ........ C01B 3/105; B01D 53/68; B01D 53/76; B01D 2257/2045; B01J 19/08; B01J 19/2465; B01J 2219/0896; C01C 1/16
(Continued)

(56) References Cited

U.S. PATENT DOCUMENTS

2008/0111105 A1    5/2008  Shim et al.
2010/0098622 A1*   4/2010  Saxena .................. B01J 7/02
                                                                 423/657

(Continued)

FOREIGN PATENT DOCUMENTS

EP         3632842 A4     3/2021
JP         2008120675     5/2008
(Continued)

OTHER PUBLICATIONS

WO-2018117272-A1 English translation (Year: 2018).*
(Continued)

*Primary Examiner* — Anita Nassiri-Motlagh
(74) *Attorney, Agent, or Firm* — Law Office of Katsuhiro Arai

(57) ABSTRACT

According to one embodiment, a magnesium-recycling hydrogen generation system includes: a by-product acquisition unit that separates a by-product from a post-reaction solution, which is a solution after reacting with a hydrogen generation material containing a hydrogen-containing magnesium compound that generates hydrogen via a reaction with the solution, to acquire the by-product including more than one type of oxygen-containing magnesium compound that contains oxygen produced by the reaction, a raw material production unit that reacts the by-product with a halogen-containing substance containing halogen and other atoms than the halogen to produce a raw material containing magnesium halide, a hydrogen generation material produc-
(Continued)

tion unit that reduces the raw material with plasma containing hydrogen to produce the hydrogen generation material, and a hydrogen generator that reacts the hydrogen generation material with the solution to generate hydrogen.

13 Claims, 6 Drawing Sheets

(51) Int. Cl.
  *B01D 53/76* (2006.01)
  *B01J 19/08* (2006.01)
  *B01J 19/24* (2006.01)
  *C01C 1/16* (2006.01)

(52) U.S. Cl.
  CPC .............. *B01J 19/2465* (2013.01); *C01C 1/16* (2013.01); *B01D 2257/2045* (2013.01); *B01J 2219/0896* (2013.01)

(58) Field of Classification Search
  USPC ....................................................... 423/658.3
  See application file for complete search history.

(56) References Cited

U.S. PATENT DOCUMENTS

| | | |
|---|---|---|
| 2010/0136441 A1 | 6/2010 | Mori et al. |
| 2010/0323254 A1 | 12/2010 | Mori et al. |
| 2017/0183236 A1 | 6/2017 | Yoshizaki |
| 2020/0263274 A1 | 8/2020 | Takizawa et al. |

FOREIGN PATENT DOCUMENTS

| | | |
|---|---|---|
| JP | 2011032131 A | 2/2011 |
| JP | 2016204177 A | 12/2016 |
| JP | 2016216780 A | 12/2016 |
| WO | 2007116734 A1 | 10/2007 |
| WO | 2015190004 A1 | 12/2015 |
| WO | WO-2018117272 A1 * 6/2018 | ............... C01B 3/06 |

OTHER PUBLICATIONS

Extended European Search Report (EESR) dated Jul. 14, 2022, issued for European counterpart patent application No. EP19891431.9 (7 pages).

International Search Report (ISR) dated Jan. 28, 2020, issued for International application No. PCT/JP2019/044750. (2 pages).

* cited by examiner

HYDROGEN GENERATION SYSTEM, POWER GENERATION SYSTEM, HYDROGEN GENERATION METHOD, AND POWER GENERATION METHOD

CROSS-REFERENCE TO RELATED APPLICATION

This application is based on and claims the benefit of priority from Japanese Patent Application No. 2018-220782, filed on Nov. 26, 2018; the entire contents of which are incorporated herein by reference.

FIELD

Embodiments described herein relate generally to a hydrogen generation system, a power generation system, a hydrogen generation method, and a power generation method.

BACKGROUND

In recent years, hydrogen has been attracting attention as an energy source that does not use fossil fuels.

Hydrogen can be stored in a variety of ways, such as being compressed in a high pressure cylinder, being liquefied at low temperature, and being absorbed in a hydrogen storage material. Among them, the method using a hydrogen storage material does not require hydrogen to be stored in specific conditions such as at high pressure or low temperature, and therefore is easy to handle and highly safe as compared to other methods. The method also has an advantageous feature of high hydrogen storage capacity per unit volume.

As an example of the method using a hydrogen storage material, there is known one in which magnesium is used as a hydrogen storage material, and hydrogen is adsorbed onto the magnesium and stored as magnesium hydride. Hydrogen can be produced (extracted) by reacting the magnesium hydride with water.

In this case, the reaction between the magnesium hydride with water produces magnesium hydroxide as a by-product.

Japanese Patent Application Laid-open Publication No. 2016-204177 discloses a hydrogen generating method in which magnesium hydride is reacted with water to produce hydrogen such that magnesium oxide instead of magnesium hydroxide is formed as a by-product. Since magnesium hydride can be produced from magnesium oxide using DC hydrogenated plasma, magnesium oxide is obtained as a by-product (reference may be had to Japanese Patent Application Laid-open Publication No. 2011-032131).

Specifically, assuming an equilibrium curve of magnesium hydroxide and magnesium oxide where the x-axis represents temperature and the y-axis represents the partial pressure of water vapor, when the partial pressure of water vapor is lower than that on the equilibrium curve, magnesium oxide is produced stably while magnesium hydroxide cannot. Therefore, if hydrogen is generated by reacting magnesium hydride with water (steam) under such conditions of the partial pressure of water vapor, magnesium oxide can be obtained as a by-product.

For example, the condition with a temperature of 140° C. and a water vapor partial pressure of 0.0045 bar corresponds to a point on the equilibrium curve. Accordingly, when the temperature is 140° C., the proportion of magnesium oxide in the by-product can be increased by reacting magnesium hydride with water vapor having a partial pressure of less than 0.0045 bar.

Under such conditions, even if magnesium hydroxide is produced, it decomposes to magnesium oxide.

Incidentally, lowering the partial pressure of water vapor means reducing the water content, which implies that the total amount of water that reacts with magnesium hydride is reduced.

For example, Japanese Patent Application Laid-open Publication No. 2016-204177 describes that when the particle size of magnesium hydride is reduced from 60 µm to 5 µm, the time required for the reaction can be reduced at a temperature of around 230° C. However, the proportion of magnesium oxide was reduced from 98.8% to 88.1%, and the proportion of magnesium oxide was only increased from 0.54% to 11.25% in the two-day treatment; it can be inferred that the rate of hydrogen generation decreased significantly. Besides, for example, the longer it takes to produce a raw material (magnesium oxide in Patent Documents 1 and 2) for producing a hydrogen generation material of magnesium hydride, the more energy it requires.

Thus, there is still room for improvement in the magnesium-recycling hydrogen generation system.

DETAILED DESCRIPTION

Figure 1:
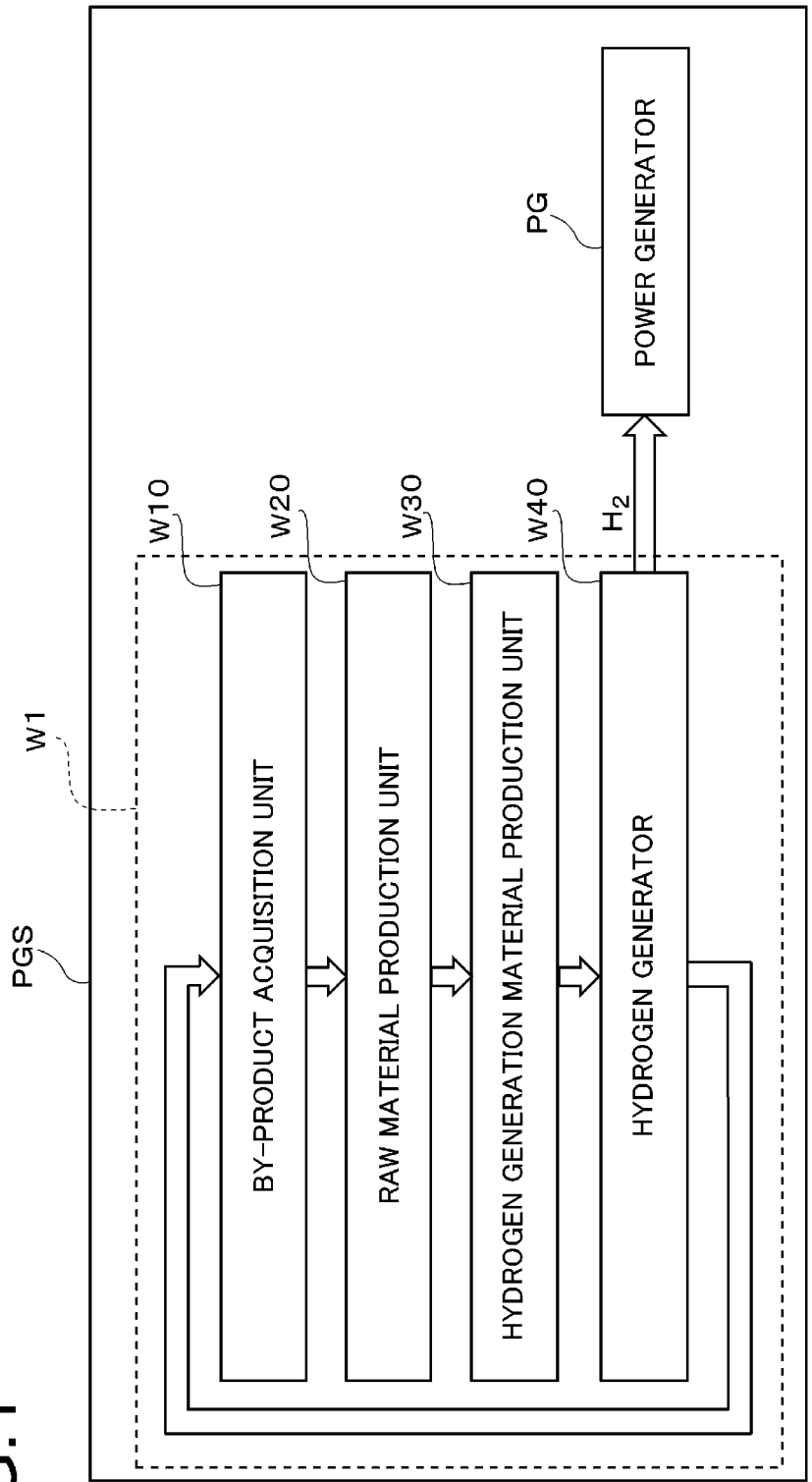
FIG. 1 is a block diagram for explaining a power generation system according to an embodiment.

In general, according to one embodiment, a hydrogen generation system is a magnesium-recycling hydrogen generation system. The hydrogen generation system includes: a by-product acquisition unit that separates a by-product from a post-reaction solution, which is a solution after reacting with a hydrogen generation material containing a hydrogen-containing magnesium compound that generates hydrogen via a reaction with the solution, to acquire the by-product including more than one type of oxygen-containing magnesium compound that contains oxygen produced by the reaction, a raw material production unit that reacts the by-product with a halogen-containing substance containing halogen and other atoms than the halogen to produce a raw material containing magnesium halide, a hydrogen generation material production unit that reduces the raw material with plasma containing hydrogen to produce the hydrogen generation material, and a hydrogen generator that reacts the hydrogen generation material with the solution to generate hydrogen.

According to another embodiment, a power generation system includes a power generator that generates electricity using hydrogen. The power generator is supplied with hydrogen generated by the hydrogen generation system.

According to still another embodiment, a hydrogen generation method is a magnesium-recycling hydrogen generation method. The hydrogen generation method includes: separating a by-product from a post-reaction solution, which is a solution after reacting with a hydrogen generation material containing a hydrogen-containing magnesium compound that generates hydrogen via a reaction with the solution, to acquire the by-product including more than one type of oxygen-containing magnesium compound that contains oxygen produced by the reaction, reacting the by-product with a halogen-containing substance containing halogen and other atoms than the halogen to produce a raw material containing magnesium halide, reducing the raw material with plasma containing hydrogen to produce the hydrogen generation material, and reacting the hydrogen generation material with the solution to generate hydrogen.

According to still another embodiment, a power generation method is a method to generate electricity using hydrogen. The power generation method includes: generating electricity using hydrogen, and supplying hydrogen generated by the hydrogen generation method for the generating electricity using hydrogen.

In the following, illustrative embodiments will be described in detail with reference to the accompanying drawings. Note that like parts are designated by like reference numerals or characters throughout the description of the embodiments.

FIG. 1 is a block diagram for explaining a power generation system PGS according to an embodiment. First, the power generation system PGS and a hydrogen generation system W1 will be briefly described with reference to FIG. 1.

The power generation system PGS includes, for example, a power generator PG including a power generation device GNT (e.g., a hydrogen turbine generator or a fuel cell) that generates electricity using hydrogen as a fuel.

As illustrated in FIG. 1, the hydrogen generation system W1 includes a by-product acquisition unit W10, a raw material production unit W20, a hydrogen generation material production unit W30, and a hydrogen generator W40. In the power generation system PGS, the power generator PG, which uses hydrogen to generate electricity, is supplied with hydrogen generated by the hydrogen generator W40, thereby generating electricity.

Note that the hydrogen generation system W1 requires electricity to generate hydrogen plasma (microwave surface-wave hydrogen plasma) or to perform heat treatment as described later; however, the required electricity can be covered by surplus electricity from existing power plants and/or natural energy such as solar power and wind power.

Solar and wind power generation, in particular, has a problem that the power generation has to be stopped when the power demand is low, and also the power generation amount may decrease due to the weather. However, by combining them with the power generation system PGS of the embodiment, instead of stopping the solar power generation, the wind power generation, or the like when the power demand is low, the power can be utilized to produce a hydrogen generation material 421, which is a material for generating hydrogen in the hydrogen generator W40 of the hydrogen generation system W1. Hydrogen can be extracted from the hydrogen generation material 421 to generate electricity when electric power is required. Thereby, clean energy can be stably supplied.

The hydrogen generator W40 includes a reaction unit that performs a reaction to generate hydrogen (described later in detail with reference to FIG. 3).

In the embodiment, the reaction unit stores a solution (e.g., aqueous solution 411) to be reacted with the hydrogen generation material 421 containing a hydrogen-containing magnesium compound that generates hydrogen via a reaction with the solution. The reaction unit is a solution storage 410 that serves as a reaction container where a reaction takes place to produce hydrogen when provided with the hydrogen generation material 421.

Magnesium hydride ($MgH_2$) can be cited as an example of the hydrogen-containing magnesium compound that generates hydrogen via a reaction with the solution.

As described later with reference to FIG. 2, the hydrogen generation material production unit W30 produces magnesium hydride as a hydrogen-containing magnesium compound by irradiation of hydrogen plasma on raw materials containing magnesium halide (e.g., magnesium chloride ($MgCl_2$). However, not all the raw materials always turn into magnesium hydride. As a result, the hydrogen generation material 421 may sometimes contain raw materials that have not reacted in the process of producing magnesium hydride or metallic magnesium that has also been produced by the process.

Specifically, in the hydrogen generator W40, a reaction represented by the following Formula 1 mainly occurs between magnesium hydride and the solution as a reaction to produce hydrogen. In addition, when the hydrogen generation material 421 contains metallic magnesium, a reaction represented by the following Formula 2 also occurs between magnesium metal and the solution through the reaction to generate hydrogen.

$$MgH_2 + 2H_2O \rightarrow Mg(OH)_2 + 2H_2 + 334.08 \text{ KJ/mol} \quad (1)$$

$$Mg + 2H_2O \rightarrow Mg(OH)_2 + H_2 + 369.98 \text{ KJ/mol} \quad (2)$$

However, when the solution (the aqueous solution 411) is at low temperature, the reaction represented by Formula 2 proceeds slowly and produces less hydrogen. Therefore, it is preferable that the hydrogen generation material 421 contains little metallic magnesium.

Presumably, the post-reaction solution, i.e., the solution after the reaction, mainly contains magnesium hydroxide ($Mg(OH)_2$) as a by-product 116 produced in the reaction.

However, in some cases, reactions represented by the following Formulas 3 and 4 may possibly occur, and therefore, a small amount of magnesium oxide (MgO) may be contained as the by-product 116.

$$MgH_2 + H_2O \rightarrow MgO + 2H_2 + 301.75 \text{ KJ/mol} \quad (3)$$

$$Mg + H_2O \rightarrow MgO + H_2 + 337.65 \text{ KJ/mol} \quad (4)$$

Accordingly, the post-reaction solution, i.e., the solution after reacting with the hydrogen generation material 421 containing a hydrogen-containing magnesium compound that generates hydrogen via a reaction with the solution, contains the by-product 116 including more than one type of oxygen-containing magnesium compound ($Mg(OH)_2$, MgO, etc.) that contains oxygen produced by the reaction.

Although the solution is described as the aqueous solution 411 (i.e., water) in the embodiment, the solution need not necessarily be limited to the aqueous solution 411 as long as it does not contain a substance that reacts with the oxygen-containing magnesium compound ($Mg(OH)_2$, MgO, etc.), mainly magnesium hydroxide ($Mg(OH)_2$), and dissolves the magnesium hydroxide in the solution.

In the by-product acquisition unit W10 (described later in detail with reference to FIG. 4), the by-product 116 including more than one type of oxygen-containing magnesium compound ($Mg(OH)_2$, MgO, etc.) is separated from the post-reaction solution. In the raw material production unit W20 (described later with reference to FIG. 5), the separated by-product 116 is reacted with a halogen-containing substance (e.g., HCl, NH$_4$Cl, etc.) containing halogen and other atoms than halogen to produce a raw material containing magnesium halide.

For example, both magnesium hydroxide (Mg(OH)$_2$) and magnesium oxide (MgO) produce magnesium chloride (MgCl$_2$) when reacting with heated gaseous hydrochloric acid (HCl) that contains no water.

Both magnesium hydroxide (Mg(OH)$_2$) and magnesium oxide (MgO) also produce magnesium chloride (MgCl$_2$) when mixed with ammonium chloride (NH$_4$Cl) and heated to about the decomposition temperature of ammonium chloride, for example, at atmospheric pressure, about 340° C. to 450° C., more preferably about 340° C. to 400° C.

Then, as mentioned above, in the hydrogen generation material production unit W30, the hydrogen generation material 421 is produced again by irradiation of hydrogen plasma (microwave surface-wave hydrogen plasma) on the raw material containing magnesium halide.

That is, the hydrogen generation system W1 of FIG. 1 includes the by-product acquisition unit W10, the raw material production unit W20, the hydrogen generation material production unit W30, and the hydrogen generator W40, which are outlined above. Thus, the hydrogen generation system W1 is basically a magnesium-recycling system which recycles magnesium instead of disposing of it.

In the power generation system PGS illustrated in FIG. 1, the power generator PG can be provided with the power generation device GNT (e.g., a hydrogen turbine generator or a fuel cell) that generates electricity using general hydrogen as a fuel. Therefore, the hydrogen generation system W1 will be mainly described below in detail in the order of the hydrogen generation material production unit W30, the hydrogen generator W40, the by-product acquisition unit W10, and the raw material production unit W20.

(Hydrogen Generation Material Production Unit W30)

Figure 2:
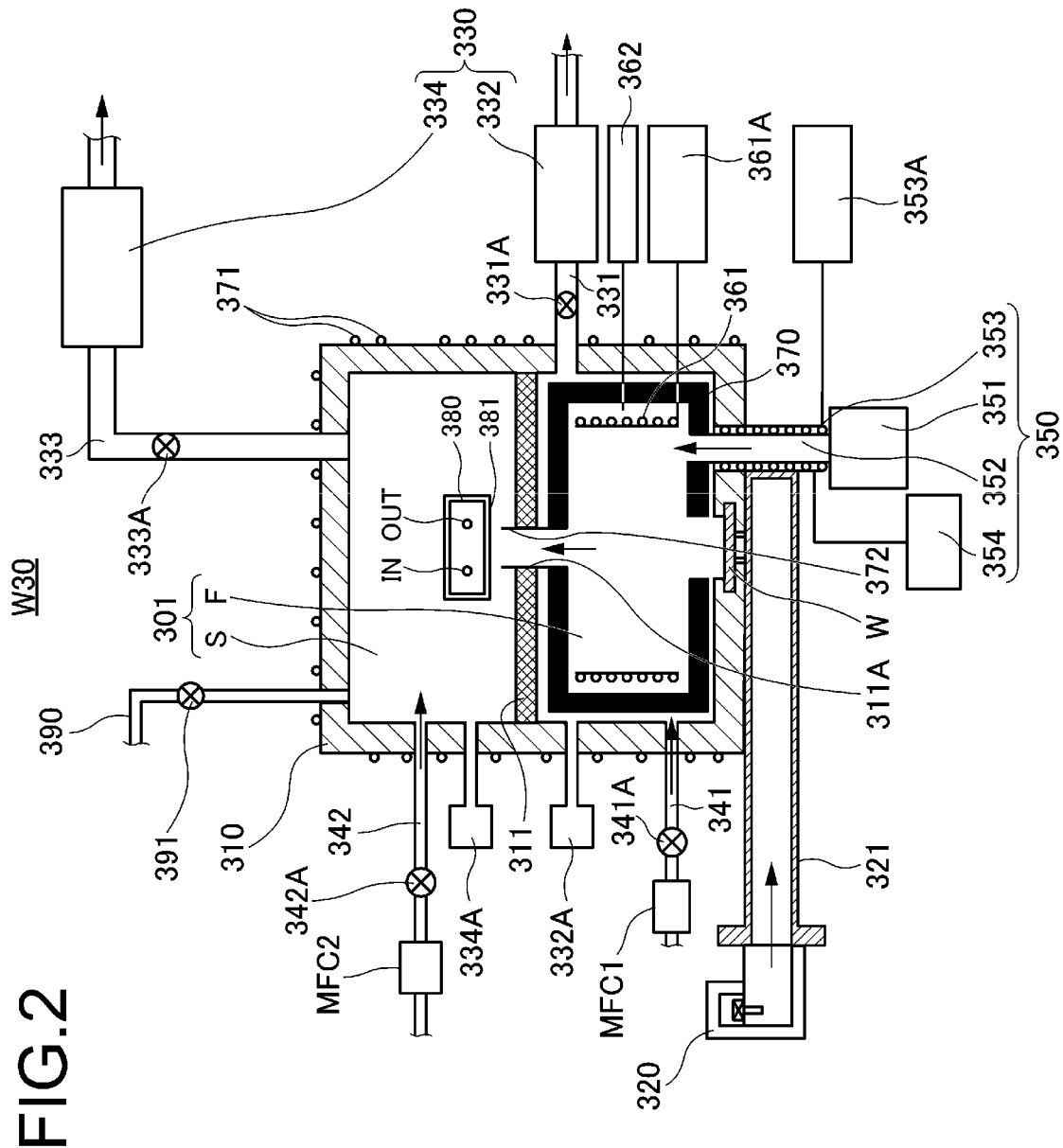
FIG. 2 is a diagram for explaining a hydrogen generation material production unit according to an embodiment.

FIG. 2 is a diagram for explaining the hydrogen generation material production unit W30.

As illustrated in FIG. 2, the hydrogen generation material production unit W30 is provided with a housing 310 that forms a treatment chamber 301. In this embodiment, the inside of the housing 310 is divided by a partition plate 311 having an opening 311A in the center such that the treatment chamber 301 has a first space F and a second space S.

However, the partition plate 311 may be omitted, and the treatment chamber 301 may be formed as one space.

The hydrogen generation material production unit W30 includes: a window W made of a dielectric material (e.g., quartz or ceramics), which is located in a portion of the treatment chamber 301 where microwaves are incident; a microwave generator 320 (e.g., a magnetron) that generates microwaves to be supplied to the first space F in the treatment chamber 301 through the window W to generate plasma; and a wave guide 321 that guides the microwaves generated by the microwave generator 320 to the window W.

It is assumed in the embodiment that the generated microwaves have a frequency of 2.45 GHz; however, the frequency need not necessarily be limited to this. For example, the microwaves may have ISM band frequencies available for purposes other than communication such as 24.1 GHz, 5 GHz, 915 MHz, 40.6 MHz, 27.1 MHz, 13.56 MHz, or the like.

In the embodiment, the microwave generator 320 generates pulsed microwaves, wherein the average microwave power (microwave intensity) is reduced, while the peak value of the microwave power (microwave intensity) is increased.

Note that the term "pulsed microwaves" refers to those with periodic changes in the microwave power (microwave intensity), and the pulsed microwaves are not necessarily limited to those where the microwave power (microwave intensity) periodically becomes zero.

Specifically, the microwave generator 320 generates pulsed microwaves where the peak value of the microwave power (microwave intensity) appears in a cycle of 150 microseconds or less (desirably 100 microseconds or less, more desirably microseconds or less). The microwave generator 320 supplies the treatment chamber 301 with the microwaves with a microwave power at the peak value before the plasma (in this example, microwave surface-wave hydrogen plasma) is significantly attenuated.

With this, it is possible to reduce the average power used by the microwave generator 320 while maintaining the microwave surface-wave plasma having a density substantially corresponding to the peak value of the microwave power (microwave intensity).

It is assumed, for example, that the microwave generator 320 generates not pulsed microwaves but microwaves with a substantially constant microwave power (microwave intensity), and the plasma density is in the range of $10^{12}$/cm$^3$ to $10^{14}$/cm$^3$.

In this case, when the microwave generator 320 generates pulsed microwaves, the peak value of the microwave power (microwave intensity) can be increased even if the average microwave power is the same. Thus, higher plasma density (e.g., a high plasma density of $10^{15}$/cm$^3$ or more) can be achieved.

That is, when the microwave generator 320 generates pulsed microwaves, even if the average microwave power is the same, it is possible to achieve a plasma density higher by one digit or more as compared to non-pulsed microwaves where the microwave power (microwave intensity) is substantially constant.

Therefore, since the microwave generator 320 is configured to generate pulsed microwaves, it is possible to generate a high-density microwave surface-wave plasma while suppressing an increase in the amount of electric power (average power) used in the microwave generator 320.

In addition, an increase in the peak value of the microwave power (microwave intensity) has an effect in facilitating the ignition of the microwave surface-wave plasma.

The microwave surface-wave plasma has a lower electron temperature (e.g., about 1 eV) than other plasmas (e.g., high-frequency plasma, DC discharge plasma, etc.), and has an advantage in its small energy loss compared to other plasmas which consume energy to obtain a high electron temperature (e.g., 10 eV or more).

Besides, the microwave surface-wave plasma is characterized in that the temperature of ions and molecules in the plasma is significantly lower (almost room temperature) than that of what is called thermal plasma.

Further, in the case of microwave surface-wave plasma, a high-density plasma as described above can be uniformly generated in a large area of, for example, 0.5 m$^2$ or more. Microwaves to be incident on the treatment chamber 301 propagate through the window W, but are absorbed as surface waves. Accordingly, microwaves (electromagnetic waves) are not present in the treatment chamber 301, which allows a high degree of freedom in designing the inside of the treatment chamber 301.

The hydrogen generation material production unit W30 also includes a decompressor 330 that discharges the gas from the treatment chamber 301 to decompress the inside of the treatment chamber 301.

Specifically, the hydrogen generation material production unit W30 includes a first vacuum pump 332 as the decompressor 330 that is connected to the first space F via a first exhaust pipe 331 having a first exhaust valve 331A in the middle thereof for determining whether or not to discharge the gas in response to open/close operation or open/close control, and a second vacuum pump 334 as the decompressor 330 that is connected to the second space S via a second exhaust pipe 333 having a second exhaust valve 333A in the middle thereof for determining whether or not to discharge the gas in response to open/close operation or open/close control.

If a vacuum pump with a low gas suction force is used, it takes time to increase the degree of vacuum in the treatment chamber 301. Therefore, in order to reduce such setup time, at least one of the first vacuum pump 332 and the second vacuum pump 334 is preferably a mechanical booster pump with a high gas suction force.

The hydrogen generation material production unit W30 is provided with a first pressure gauge 332A to measure the pressure in the first space F of the treatment chamber 301 and a second pressure gauge 334A to measure the pressure in the second space S of the treatment chamber 301.

For example, the operation of the first vacuum pump 332 and the first exhaust valve 331A may be controlled to set the pressure in the first space F to a predetermined value (e.g., about 10 Pa) based on the pressure measured by the first pressure gauge 332A.

For example, the operation of the first exhaust valve 331A may be controlled based on the pressure measured by the first pressure gauge 332A while the first vacuum pump 332 is operating.

Similarly, for example, the operation of the second vacuum pump 334 and the second exhaust valve 333A may be controlled to set the pressure in the second space S to a predetermined value (e.g., about 10 Pa) based on the pressure measured by the second pressure gauge 334A.

For example, the operation of the second exhaust valve 333A may be controlled based on the pressure measured by the second pressure gauge 334A while the second vacuum pump 334 is operating.

In the embodiment, an example is described in which the pressure in the treatment chamber 301 is set to about 10 Pa, at which high-density plasma is easily formed.

However, since the reduction treatment may be promoted also by the high partial pressure of reactive gas (in this example, hydrogen gas) described later, a determination may be made by conducting a preliminary experiment as to whether to place priority on increasing the decompression degree to increase the plasma density or on increasing the partial pressure of reactive gas by setting the pressure in the treatment chamber 301 to about 500 Pa to 3000 Pa despite it results in a lower decompression degree.

Besides, as described above, in order to set the pressure in the first space F and the second space S to a predetermined value, it is not necessarily required to control both of the two vacuum pumps (the first vacuum pump 332 and the second vacuum pump 334).

For example, as a preparatory step, the two vacuum pumps (the first vacuum pump 332 and the second vacuum pump 334) may be operated only when the pressure in the treatment chamber 301 is set to a predetermined value. In this case, the first exhaust valve 331A is closed to stop the operation of the first vacuum pump 332 when the pressure in the treatment chamber 301 reaches the predetermined value. Thereafter, the operation of the second vacuum pump 334 and the second exhaust valve 333A is controlled such that the pressure in the treatment chamber 301 is maintained at the predetermined value based on the pressure measured by the first pressure gauge 332A or the second pressure gauge 334A.

As the measured value of the pressure in the treatment chamber 301 used to maintain the pressure in the treatment chamber 301 at a predetermined value, the average of the pressures measured by the first pressure gauge 332A and the second pressure gauge 334A may be used.

The hydrogen generation material production unit W30 includes a gas supply unit (not illustrated) to supply the treatment chamber 301 with a reactive gas, which contains substantially no oxygen atom that turns into plasma.

In the embodiment, hydrogen is used as the reactive gas that causes the reduction reaction. However a hydrocarbon gas such as methane or propane can also cause the reduction reaction, and therefore the reactive gas is not limited to hydrogen. Any reactive gas that forms a reducing atmosphere containing hydrogen may be used.

Accordingly, although hereinafter the gas supply unit is referred to as "hydrogen supply unit", the hydrogen supply unit is only an example of the gas supply unit.

However, when hydrocarbon gas is used, the exhaust gas contains carbon. Therefore, it is preferable to use hydrogen gas to reduce carbon.

Besides, if the reactive gas contains oxygen atoms, which may hinder the reduction reaction. However, even a very high-purity gas with a low dew point contains a small amount of moisture, and not that no oxygen atom is present at all. Therefore, the term "contain substantially no oxygen atom" refers to being at the same purity level as high-purity gas (e.g., 99.9% or higher) and not containing oxygen atoms such as water.

For example, the hydrogen supply unit includes a hydrogen storage (hydrogen cylinder or hydrogen tank) that serves as a hydrogen supply source (not illustrated), and a flow rate controller (a first flow controller MFC1 and a second flow controller MFC2) such as a mass flow controller that controls the amount of hydrogen supplied from the hydrogen storage to the treatment chamber 301.

Note that if a cylinder is used as the hydrogen storage, it is to be removed for replacement, and the hydrogen supply unit may sometimes not have the hydrogen storage.

Specifically, the hydrogen supply unit includes a first supply pipe 341 that is connected to the hydrogen storage so that hydrogen can be supplied to the first space F, the first flow controller MFC1 that is located on the first supply pipe 341 on the hydrogen storage side, and a first supply valve 341A that is located downstream of the position of the first flow controller MFC1 on the first supply pipe 341 for determining whether or not to supply hydrogen in response to open/close operation or open/close control.

Similarly, the hydrogen supply unit includes a second supply pipe 342 that is connected to the hydrogen storage so that hydrogen can be supplied to the second space S, the second flow controller MFC2 that is located on the second supply pipe 342 on the hydrogen storage side, and a second supply valve 342A that is located downstream of the position of the second flow controller MFC2 on the second supply pipe 342 for determining whether or not to supply hydrogen in response to open/close operation or open/close control.

The hydrogen generation material production unit W30 further includes a raw material supplier 350 that supplies a raw material containing anhydrous magnesium halide (in this example, the main component of the raw material is anhydrous magnesium chloride) in gaseous form to the treatment chamber 301 (more specifically, in the first space F of the treatment chamber 301).

Specifically, the raw material supplier 350 includes a raw material storage 351 that stores anhydrous magnesium halide (in this example, anhydrous magnesium chloride) as a raw material to be reduced with plasma, a raw material supply pipe 352 to supply the raw material in the raw material storage 351 to the first space F of the treatment chamber 301, a first heater 353 that generates heat using electricity supplied from a first power source 353A to heat the raw material supply pipe 352 and the raw material storage 351, and a first thermometer 354 that measures the temperature of the first heater 353.

The amount of electricity supplied from the first power source 353A to the first heater 353 is controlled so as to adjust the temperature measured by the first thermometer 354 to a predetermined set value, and the raw material supply pipe 352 and the raw material storage 351 are heated to a predetermined temperature.

When the raw material to be treated with plasma is anhydrous magnesium chloride as in the embodiment, the first heater 353 heats the raw material supply pipe 352 and the raw material storage 351 to a temperature of about 700° C. so that the anhydrous magnesium chloride turns into a gaseous form.

As a result, the vaporized anhydrous magnesium chloride flows toward the first space F of the treatment chamber 301 and is supplied to the first space F.

The hydrogen generation material production unit W30 further includes a temperature controller 360 that maintains the temperature in the treatment chamber 301 above the boiling point of the raw material (in this example, anhydrous magnesium chloride) to be treated with plasma (the boiling point is about 650° C. when the pressure in the treatment chamber 301 is about 10 Pa).

Specifically, the temperature controller 360 includes a second heater 361 that is arranged in the first space F of the treatment chamber 301 to heat the inside of the treatment chamber 301, a second power source 361A that supplies electricity to the second heater 361, and a second thermometer 362 that measures the temperature in the first space F of the treatment chamber 301.

The hydrogen generation material production unit W30 controls the amount of electricity supplied from the second power source 361A to the second heater 361 so as to adjust the temperature measured by the second thermometer 362 to a predetermined set value, thereby maintaining the temperature in the first space F of the treatment chamber 301 at a predetermined value.

In the embodiment, the temperature controller 360 maintains the temperature in the treatment chamber 301 at about 700° C., at which anhydrous magnesium chloride, i.e., the raw material to be treated with plasma, is kept in gaseous form.

In this embodiment, since the boiling point of anhydrous magnesium chloride is about 650° C. at a pressure of about 10 Pa, the temperature is maintained at about 700° C., which is higher than the boiling point.

However, since the boiling point varies depending on the pressure, the set temperature of the temperature controller 360 is changed according to a change in the set pressure in the treatment chamber 301.

Further, although anhydrous magnesium chloride is used as the raw material in the embodiment, magnesium fluoride or the like may also be used as the raw material. In such cases where magnesium fluoride or the like is used as the raw material, the set temperature of the temperature controller 360 is also changed according to the difference in the raw materials.

A reflector 370 is arranged outside the second heater 361 to reflect radiant heat, thereby preventing the temperature of the housing 310 from rising high due to the radiant heat from the second heater 361. In addition, a cooling pipe 371 is arranged on the outer surface of the housing 310 for the purpose of water cooling.

As described above, when the hydrogen generation material production unit W30 includes a heat insulator such as the reflector 370 that prevents heat conduction so that the second heater 361 does not heat an unnecessary place, the housing 310 is prevented from getting hot. This can not only suppress the degradation of the packing or the like used in some parts of the housing 310, but also increase the heat retention efficiency, resulting in less power consumption.

The reflector 370 has, at a position near the center of the upper part, an insertion tube 372 which is inserted into the second space S from the first space F through the opening 311A of the partition plate 311. With this, hydrogen plasma and the gaseous raw material or the like (including those in a state of being reduced with plasma) are discharged from the insertion tube 372 to the second space S.

As illustrated in FIG. 2, the hydrogen generation material production unit W30 includes, at a position facing the insertion tube 372, an attachment member 380 to which the hydrogen generation material 421 containing a hydrogen-containing magnesium compound that generates hydrogen via a reaction with a solution (in this example, the aqueous solution 411) described later is to be attached. The attachment member 380 is detachably attached to the housing 310 so that it can be taken out from the treatment chamber 301.

As will be described later, the attachment member 380 is taken out from the treatment chamber 301 to obtain the hydrogen generation material 421 attached thereto by scraping it off a surface 381 of the attachment member 380.

However, the attachment member 380 need not necessarily be taken out of the treatment chamber 301 to obtain the hydrogen generation material 421.

There may be provided a hydrogen generation material collector that, when a certain amount of the hydrogen generation material 421 has been attached to the surface 381 of the attachment member 380, automatically scrapes it off the surface 381 of the attachment member 380 to collect the hydrogen generation material 421.

Note that the microwave surface-wave plasma is characterized in that the temperature of ions and molecules in the plasma is significantly lower (almost room temperature) than that of what is called thermal plasma.

Therefore, when the attachment member 380 is made of a metal (e.g., stainless steel) or the like with excellent heat resistance and corrosiveness, even if the attachment member 380 is arranged such that the surface 381 is located near the insertion tube 372 within the range where there is plasma whose emission can be visually observed, it can sufficiently withstand the treatment atmosphere.

The attachment member 380 is provided with a medium supply port IN to supply a temperature control medium (e.g., outside air as a coolant or water that has passed through a cooling device) and a medium outlet port OUT to discharge the temperature control medium. The attachment member 380 has a closed container structure so that the temperature control medium does not leak into the second space S of the treatment chamber 301.

The hydrogen generation material production unit W30 includes, for example, a medium supply unit (e.g., a fan, a compressor, etc., not illustrated) to supply the outside air as the temperature control medium into the attachment member 380 through the medium supply port IN.

The temperature of the surface 381 of the attachment member 380, to which the hydrogen generation material 421 is to be attached, can be controlled to be within a predetermined temperature range suitable for the attachment of the hydrogen generation material 421 containing a high proportion of hydrogen-containing magnesium compounds (in this example, magnesium hydride) that generate hydrogen via a reaction with a solution (in this example, the aqueous solution 411).

When the outside air is used as the temperature control medium as described above, the pipe may be connected such that the medium outlet port OUT is open to the atmosphere.

On the other hand, when water or the like is used as the temperature control medium, the hydrogen generation material production unit W30 may be provided with a cooling device (heat exchanger, etc.) having a pump that circulates the water or the like discharged from the medium discharge port OUT to the medium supply port IN as a medium supply unit (not illustrated).

In order to increase the hydrogen generation amount of the hydrogen generation material 421, as described above, it is preferable that the hydrogen generation material 421 contain a high proportion of hydrogen-containing magnesium compounds (specifically, magnesium hydride).

That is, it is preferable that the hydrogen generation material 421 attached to the surface 381 of the attachment member 380 do not contain the raw material such as magnesium halide (in this example, magnesium chloride) or metallic magnesium (Mg).

Under the condition where the pressure is about 10 Pa, magnesium hydride starts to decompose into metallic magnesium and hydrogen at a temperature of about 100° C. or higher. For this reason, in order to efficiently obtain magnesium hydride, it was considered preferable to bring the surface 381 of the attachment member 380 to a low temperature (e.g., below 80° C.).

Therefore, the hydrogen generation material 421 was made to be attached to the surface 381 while the surface 381 was maintained at a low temperature with a temperature control medium. As a result, a tendency was certainly observed that the amount of the hydrogen generation material 421 attached per unit time was increased and the hydrogen generation material 421 with a high generation rate of hydrogen was obtained.

However, by maintaining the temperature of the surface 381 at a low temperature, the hydrogen generation material 421 attached to the surface 381 could not be made white, which is the original color of magnesium hydride, and it still contained metallic magnesium and the like.

While repeating the experiment, the inventors found that the hydrogen generation material 421 attached to the surface 381 had a white color and foamed more intensely than ever by reaction with water when the temperature of the surface 381 of the attachment member 380 became relatively high.

Incidentally, the amount of generated hydrogen was measured not only in the foaming state but also in a hydrogen detector tube.

Therefore, the experiment was proceeded with the surface 381 having a high temperature. As a result, the inventors found that it was possible to obtain the hydrogen generation material 421 which was whiter and reacted vigorously with water when the surface 381 was maintained at a temperature in the range of 400° C. to 800° C.

It was found that the temperature was preferably in the range of 450° C. to 750° C. to obtain the hydrogen generation material 421 which was more whiter and reacted vigorously with water, and more preferably in the range of 450° C. to 600° C. to obtain the hydrogen generation material 421 which was even more whiter and reacted vigorously with water.

This kind of phenomenon is not understandable since, considering the equilibrium state, magnesium hydride is decomposed.

However, as described above, the inventors speculate that this is because highly reactive hydrogen is present as the surface 381 is located within the range where there is plasma whose emission can be visually observed, and the reaction to form magnesium hydride proceeds faster than the rate at which magnesium hydride is decomposed.

More accurately, the inventors consider that, in the process of disappearance of magnesium hydride, first, it undergoes a reaction that makes it decompose into metallic magnesium and hydrogen, and then the metallic magnesium becomes a gas.

The inventors also speculate that the aforementioned presence of highly reactive hydrogen hinders the decomposition process into metallic magnesium and hydrogen, and as a result, magnesium hydride can still exist even on the surface 381 having a high temperature as described above.

Besides, when the temperature reaches above 400° C. at a pressure of about 10 Pa, metallic magnesium begins to turn into a gas, which reduces the proportion of metallic magnesium as an impurity in the hydrogen generation material 421, or it turns into magnesium hydride.

Further, an experimental result has been obtained which indicates that, under a pressure of about 10 Pa and a temperature of above 400° C., magnesium hydride is produced little by little even when plasma is irradiated after magnesium chloride is attached to the surface 381. This shows that the magnesium chloride attached to the surface 381 also turns into magnesium hydride, resulting in a decrease in the amount of magnesium chloride as an impurity in the hydrogen generation material 421.

It is speculated that the hydrogen generation material 421 containing a large amount of magnesium hydride can be obtained as a consequence of these factors.

Therefore, in a treatment at the hydrogen generation material production unit W30, preferably, the surface 381 of the attachment member 380 is maintained at a temperature in the range of 400° C. to 800° C., i.e., a predetermined temperature range suitable for the attachment of the hydrogen generation material 421 containing a high proportion of hydrogen-containing magnesium compounds (in this example, magnesium hydride) that generate hydrogen via a reaction with a solution (in this example, the aqueous solution 411).

The hydrogen generation material production unit W30 further includes a relief pipe 390 having a leak valve 391 in the middle thereof. One end (not illustrated) of the relief pipe 390 is open to the atmosphere outside the building where the hydrogen generation material production unit W30 is installed.

The relief pipe 390 is provided to make the treatment chamber 301 open to the atmosphere as an emergency measure when the pressure in the treatment chamber 301 becomes abnormal. The leak valve 391 is normally closed so that air cannot enter the treatment chamber 301.

Next, the process performed by the hydrogen generation material production unit W30 of this embodiment will be briefly described.

First, as a preparatory step, the decompressor 330 (the first vacuum pump 332 and the second vacuum pump 334) is driven to reduce the pressure in the treatment chamber 301 to a predetermined set value (e.g., about 10 Pa).

Then, the raw material (in this example, anhydrous magnesium chloride) is irradiated with plasma of hydrogen, which is a reactive gas that contains substantially no oxygen atom, in the treatment chamber 301 maintained at a temperature at which the raw material is kept in gaseous form to produce the hydrogen generation material 421.

Incidentally, the hydrogen generation material 421 contains a hydrogen-containing magnesium compound (in this example, magnesium hydride) that generates hydrogen via a reaction with a solution (in this example, the aqueous solution 411).

Specifically, plasma ignition is initiated before the gaseous raw material is supplied to the treatment chamber 301. After that, the supply of the raw material to the treatment chamber 301 starts to generate the hydrogen generation material 421.

The surface 381 of the attachment member 380 is maintained at a temperature within a predetermined temperature range.

The predetermined temperature range is the range of temperature from 400° C. to 800° C. suitable for the attachment of the hydrogen generation material 421 containing a high proportion of hydrogen-containing magnesium compounds (in this example, magnesium hydride) that generate hydrogen via a reaction with a solution (in this example, the aqueous solution 411).

As a result, the hydrogen generation material 421 containing a high proportion of hydrogen-containing magnesium compounds (in this example, magnesium hydride) that generate hydrogen is attached to the surface 381 of the attachment member 380.

When a certain amount of the hydrogen generation material 421 has been attached to the surface 381 of the attachment member 380, the operation of the hydrogen generation material production unit W30 is stopped. Then, the attachment member 380 is taken out from the treatment chamber 301 to obtain the hydrogen generation material 421 attached thereto by scraping it off the surface 381.

As described above, the hydrogen generation material 421 may be obtained by using a hydrogen generation material collector that collects the hydrogen generation material 421 attached to the surface 381 to eliminate the need of taking the attachment member 380 out of the treatment chamber 301.

The hydrogen generation material 421 thus obtained is sent to the hydrogen generator W40 and stored in a material storage 420 of the hydrogen generator W40 (described later).

Needless to say, there may be provided a transfer mechanism to automatically send the material to the material storage 420 of the hydrogen generator W40.

(Hydrogen Generator W40)

Figure 3:
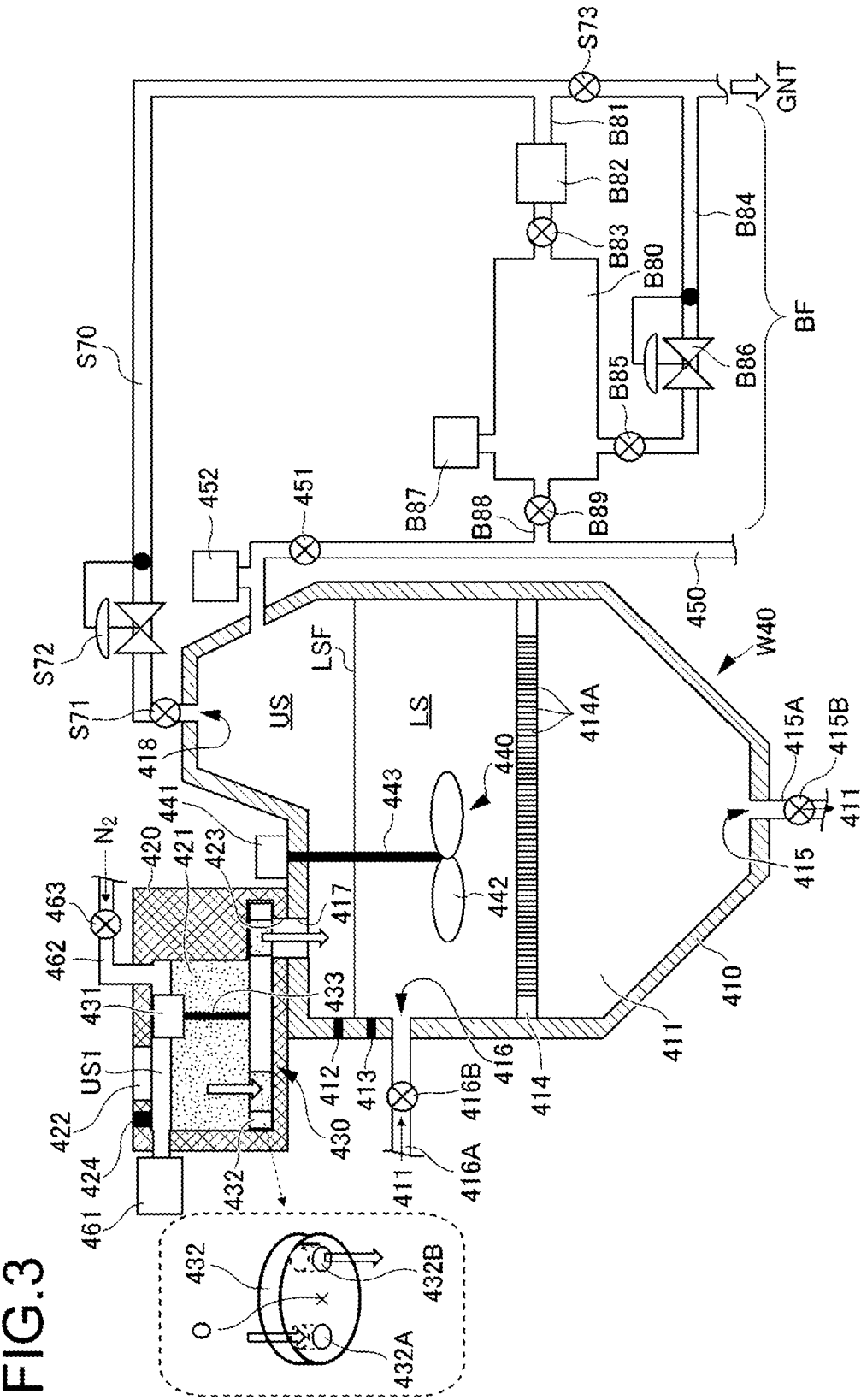
FIG. 3 is a diagram for explaining a hydrogen generator according to an embodiment.

FIG. 3 is a diagram for explaining the hydrogen generator W40.

The hydrogen generator W40 includes the solution storage 410 that stores water as a solution (hereinafter, referred to as the aqueous solution 411) to be reacted with the hydrogen generation material 421 to generate hydrogen and serves as a reaction unit for the reaction that generates hydrogen, and the material storage 420 that stores the hydrogen generation material 421 to be supplied to the solution storage 410 as a reaction unit.

The material storage 420 has a material supply mechanism 430 configured to put the hydrogen generation material 421 stored in the material storage 420 into the solution storage 410 to thereby supply the material.

Note that the hydrogen generation material 421 is preferably in the form of particles (in the form of microparticles or nanoparticles) with a small average particle diameter in order to enhance the reactivity with the aqueous solution 411.

Note, however, that the particles need not necessarily be spherical. When the average outer diameter obtained by averaging the maximum outer diameter of the particles is micrometer order, they can be considered as microparticles, and if it is smaller than micrometer order (including submicron), they can be considered as nanoparticles.

As described above, the hydrogen generation material 421 may partially contains the raw material (in this example, magnesium chloride) for producing metallic magnesium or magnesium hydride. It does not hinder the reaction between magnesium hydride and the aqueous solution 411.

Since the solution storage 410 functions as a reaction unit (also referred to as "reaction chamber") where the hydrogen generation material 421 reacts with the aqueous solution 411, it is configured to form a container having a sealed structure so that the aqueous solution 411 and hydrogen generated by the reaction or the like do not leak to the outside.

The solution storage 410 is supplied with the aqueous solution 411 such that an upper space US is formed above the aqueous solution 411. Thus, the solution storage 410 has the upper space US where the aqueous solution 411 does not exist above the aqueous solution 411.

As to the specific structure to form the upper space US, the solution storage 410 includes an upper level sensor 412 that is arranged to determine the upper limit position of the liquid surface LSF of the aqueous solution 411 and detects the liquid surface LSF, and a lower level sensor 413 that is arranged to determine the lower limit position of the liquid surface LSF of the aqueous solution 411 and detects the liquid surface LSF.

The solution storage 410 also has a lower space LS where the aqueous solution 411 exists below the upper space US. The solution storage 410 further includes a partition 414 that divides the lower space LS into upper and lower parts, a drainage port 415 that is arranged below the partition 414 to drain the aqueous solution 411, and a supply port 416 that is arranged above the partition 414 to supply the aqueous solution 411. The partition 414 has a plurality of through holes 414A.

The hydrogen generator W40 includes a drainage line 415A (also referred to as "drainage pipe") that is connected to the drainage port 415 to drain the aqueous solution 411 from the solution storage 410, and a drainage control valve 415B that is arranged on the drainage line 415A near the drainage port 415 to control the drainage of (whether or not to drain) the aqueous solution 411 from the drainage port 415.

Similarly, the hydrogen generator W40 includes a supply line 416A (also referred to as "supply pipe") that is connected to the supply port 416 to supply a new aqueous solution 411 into the solution storage 410, and a supply control valve 416B that is arranged on the supply line 416A near the supply port 416 to control the supply of (whether or not to supply) the aqueous solution 411 from the supply port 416.

With this, at a predetermined timing for supply and drainage (described later), first, a control unit of the hydrogen generator W40 (hereinafter, simply referred to as "control unit") (not illustrated) opens the drainage control valve 415B to drain the aqueous solution 411 from the solution storage 410.

After that, the control unit closes the drainage control valve 415B and opens the supply control valve 416B to supply the aqueous solution 411 into the solution storage 410 such that the liquid surface LSF of the aqueous solution 411 is located between the upper level sensor 412 and the lower level sensor 413.

Then, the control unit closes the supply control valve 416B.

For example, at the time of draining, the control unit drains the aqueous solution 411 to the extent that the liquid surface LSF of the aqueous solution 411 lowers to the position of the partition 414 based on that the lower level sensor 413 detects the liquid surface LSF of the aqueous solution 411.

Specifically, since the drainage amount per unit time when the drainage control valve 415B is opened can be checked in advance, the control unit can close the drainage control valve 415B after the lapse of time required for draining the aqueous solution 411 in an amount necessary to lower the liquid surface LSF of the aqueous solution 411 to the position of the partition 414 from when the lower level sensor 413 detects the liquid surface LSF of the aqueous solution 411 as a start point.

In addition, the control unit may be configured to start the supply of the aqueous solution 411 after the drainage of the aqueous solution 411 is completed, and stop it when the aqueous solution 411 has been supplied to the extent that the liquid surface LSF of the aqueous solution 411 is located between the upper level sensor 412 and the lower level sensor 413 based on that the lower level sensor 413 detects the liquid surface LSF of the aqueous solution 411.

As the liquid surface LSF of the aqueous solution 411 is located between the upper level sensor 412 and the lower level sensor 413, the solution storage 410 can be provided with the upper space US where the aqueous solution 411 does not exist above the aqueous solution 411.

Specifically, since the supply amount per unit time when the supply control valve 416B is opened can be checked in advance, the control unit can close the supply control valve 416B after the lapse of time required for supplying the aqueous solution 411 in an amount necessary to position the liquid surface LSF of the aqueous solution 411 between the upper level sensor 412 and the lower level sensor 413 from when the lower level sensor 413 detects the liquid surface LSF of the aqueous solution 411 as a start point.

When the upper level sensor 412 detects the liquid surface LSF of the aqueous solution 411 at a timing other than the predetermined timing for supply and drainage, the control unit (not illustrated) opens the drainage control valve 415B to drain the aqueous solution 411, and closes it after the aqueous solution 411 has been drained to the extent that the liquid surface LSF of the aqueous solution 411 is located between the upper level sensor 412 and the lower level sensor 413.

On the other hand, when the lower level sensor 413 detects the liquid surface LSF of the aqueous solution 411 at a timing other than the predetermined timing for supply and drainage, the control unit (not illustrated) opens the supply control valve 416B to supply the aqueous solution 411, and closes it after the aqueous solution 411 has been supplied to the extent that the liquid surface LSF of the aqueous solution 411 is located between the upper level sensor 412 and the lower level sensor 413.

The inner diameter of the above-mentioned through holes 414A of the partition 414 is set to a size that does not hinder the passage of a by-product such as magnesium hydroxide produced by the reaction between the hydrogen generation material 421 and the aqueous solution 411.

That is, the partition 414 is provided with the through holes 414A having an inner diameter that allows the passage of a by-product such as magnesium hydroxide produced by the reaction between the hydrogen generation material 421 and the aqueous solution 411 so that the by-product can be deposited below the partition 414.

As a result, the aqueous solution 411 containing a high concentration of the by-product is drained from the drainage port 415 located below the partition 414. The drainage is supplied to the by-product acquisition unit W10 (described later) as a post-reaction solution (also referred to as "post-reaction aqueous solution 411A"), which is the solution after reacting with the hydrogen generation material 421 containing a hydrogen-containing magnesium compound that generates hydrogen via a reaction with the aqueous solution 411 (solution).

Further, as illustrated in FIG. 3, the hydrogen generator W40 includes a stirring mechanism 440 that stirs the aqueous solution 411 above the partition 414.

Specifically, the stirring mechanism 440 includes a motor 441 arranged outside the upper wall of the solution storage 410, a propeller 442 located in the aqueous solution 411 above the partition 414 to stir the aqueous solution 411, and a shaft 443 that transmits the rotational force of the motor 441 to the propeller 442 and rotates the propeller 442 to stir the aqueous solution 411.

Note that the insertion part, where the shaft 443 is inserted into the solution storage 410, has an airtight structure that does not hinder the rotation and can maintain the airtightness.

The stirring mechanism 440 is provided to prevent the hydrogen generation material 421 that has not reacted with the aqueous solution 411 from accumulating on the partition 414. However, in the embodiment, the hydrogen generation material 421 is put into the aqueous solution 411 stored in advance. Therefore, the hydrogen generation material 421 efficiently diffuses into the aqueous solution 411, which facilitates the reaction that generates hydrogen. Therefore, the stirring mechanism 440 is not necessarily required.

The control unit (not illustrated) regularly drives the stirring mechanism 440 to promote the reaction between the hydrogen generation material 421 and the aqueous solution 411.

The stirring mechanism 440 may be constantly driven; however, by regularly driving the stirring mechanism 440, the by-product can be easily deposited below the partition 414.

This results in a decrease in the concentration of the by-product contained in the aqueous solution 411 above the partition 414, thereby increasing the reaction efficiency between the hydrogen generation material 421 and the aqueous solution 411.

In addition, the presence of the partition 414 can suppress an increase in the concentration of the by-product contained in the aqueous solution 411 above the partition 414 caused by that the by-product that has deposited below the partition 414 is stirred up when the stirring mechanism 440 is driven. Thus, it is possible to prevent a decrease in the efficiency of the reaction between the hydrogen generation material 421 and the aqueous solution 411 due to driving the stirring mechanism 440.

The hydrogen generator W40 further includes an emergency exhaust line 450 (also referred to as "emergency exhaust pipe") that is connected to the solution storage 410 so as to communicate with the upper space US, a solenoid valve 451 that is arranged on the emergency exhaust line 450 in a position near the part that communicates with the upper space US to control whether or not to perform emergency exhaust, and a pressure measuring device 452 (e.g., a digital manostar gauge) that is connected to the emergency exhaust line 450 in a position between the solenoid valve 451 and the solution storage 410 to measure the pressure in the upper space US.

When the pressure measuring device 452 measures the pressure in the upper space US and the measurement result indicates an abnormally high pressure, the control unit (not illustrated) opens the solenoid valve 451 to perform step-down control so that the pressure in the upper space US becomes a predetermined first pressure (required primary pressure).

After it becomes the predetermined first pressure (required primary pressure), the solenoid valve 451 is closed again under the control of the control unit (not illustrated).

The material storage 420 has a work door 422 on the upper side, which is opened and closed for filling the storage with the hydrogen generation material 421; however, it is configured to form a container having a sealed structure once the work door 422 is closed.

In addition, the material storage 420 is provided with a distance measuring device 424 (e.g., a displacement sensor) that is arranged adjacent to the work door 422 on the upper side to measure the distance to the surface of the hydrogen generation material 421 stored therein. The time to add the hydrogen generation material 421 can be figured out based on an increase in the distance to the hydrogen generation material 421 measured by the distance measuring device 424.

Note that the surface of the hydrogen generation material 421 is not always nearly flat like the aqueous solution 411; however, it can be kept relatively flat since vibration or the like occurs across the hydrogen generation material 421 by the driving of the material supply mechanism 430 (described later).

Therefore, the distance to the hydrogen generation material 421 measured by the distance measuring device 424 provides an indication of the time to add the hydrogen generation material 421.

However, as will be described later, in the embodiment, the amount of the hydrogen generation material 421 supplied to the aqueous solution 411 can be identified. Therefore, the hydrogen generation material 421 may be added based on that the amount of the hydrogen generation material 421 supplied to the aqueous solution 411 has reached a predetermined amount. In this case, the distance measuring device 424 is not required.

The material storage 420 is arranged such that at least part of the bottom wall is in close contact with the outside of the upper wall of the solution storage 410. In that part of the bottom wall in close contact, the material storage 420 has a material supply hole 423, which is formed to penetrate the bottom wall, to supply the hydrogen generation material 421 into the solution storage 410.

Similarly, the solution storage 410 has a material receiving hole 417, which penetrates the upper wall, to receive the hydrogen generation material 421 in a position corresponding to the material supply hole 423 of the material storage 420.

The material supply mechanism 430 is arranged in the material storage 420.

Specifically, the material supply mechanism 430 includes a motor 431 that is located inside the upper wall of the material storage 420, a disk 432 that is arranged adjacent to the inside of the bottom wall of the material storage 420 to convey the hydrogen generation material 421 to the position of the material supply hole 423, and a shaft 433 that transmits the rotational force of the motor 431 to the disk 432, thereby rotating the disk 432.

Although not illustrated, the material storage 420 is formed of an assembly of a bottom part and an upper part that are separable from each other so that the material supply mechanism 430 can be built therein.

Besides, as illustrated in the perspective view of the disk 432 surrounded by a dotted line frame on the left side of FIG. 3, the disk 432 has a pair of through holes (a through hole 432A and a through hole 432B) formed to face each other across the rotation center O in positions at substantially the same distance from the rotation center O.

As can be seen from FIG. 3, the material storage 420 has a laterally recessed portion for receiving part of the disk 432 in a position above the material supply hole 423. The inner surface of the recessed portion is adjacent to the upper opening of the through hole (see the through hole 432B) of the disk 432 located in the recessed portion, thereby almost closing the opening.

Accordingly, when the opening of the through hole (see the through hole 432B) of the disk 432 is located above the material supply hole 423, the opening is almost closed to the gas (mainly hydrogen) in the upper space US trying to enter the material storage 420.

As a result, the gas (mainly hydrogen) in the upper space US cannot enter the material storage 420.

On the other hand, when the through hole (the through hole 432A, the through hole 432B) of the disk 432 is located in a place other than the laterally recessed portion for receiving part of the disk 432 (e.g., see the position of the through hole 432A), the hydrogen generation material 421 enters into the through hole (see the through hole 432A).

Further, when the through hole (the through hole 432A, the through hole 432B) is positioned in the laterally recessed portion for receiving part of the disk 432 (see the position of the through hole 432B) as the disk 432 rotates, the hydrogen generation material 421 filled in the through hole (the through hole 432A, the through hole 432B) is supplied through the material supply hole 423 and the material receiving hole 417 to the aqueous solution 411 from the upper space US side.

In the embodiment, the hydrogen generator W40 includes a pressure measuring device 461 (e.g., a digital manostar gauge) that measures the pressure in the upper space US1 where the hydrogen generation material 421 does not exist above the hydrogen generation material 421 in the material storage 420, a gas supply line 462 (also referred to as "gas supply pipe") that supplies a gas (e.g., a low active gas such as nitrogen with a low dew point or an inert gas such as helium and argon with a low dew point) to the upper space US1, and a solenoid valve 463 that is arranged on the gas supply line 462 to control whether or not to supply the gas to the upper space US1.

The control unit (not illustrated) controls the open/close of the solenoid valve 463 to set the pressure in the upper space US1 to a predetermined value (e.g., a pressure similar to that in the upper space US of the solution storage 410)

based on the measurement result obtained by the pressure measuring device 461 that measures the pressure in the upper space US1.

Although not illustrated, the hydrogen generator W40 includes a gas exhaust line (also referred to as "gas supply pipe") to exhaust gas in the upper space US1, and a solenoid valve to control whether or not to exhaust gas in the upper space US1 through the gas exhaust line.

Therefore, more accurately, the control unit (not illustrated) controls the above-mentioned solenoid valve 463 and the solenoid valve that controls whether or not to exhaust gas to set the pressure in the upper space US1 to a predetermined value (e.g., a pressure similar to that in the upper space US of the solution storage 410).

Since the pressure in the upper space US1 is increased, the gas (mainly hydrogen) in the upper space US can be further prevented from entering the material storage 420. In addition, when the through hole (the through hole 432A, the through hole 432B) of the disk 432 is located in a place other than the laterally recessed portion for receiving part of the disk 432 (e.g., see the position of the through hole 432A), the hydrogen generation material 421 efficiently enters into the through hole (the through hole 432A, the through hole 432B).

In the embodiment, when the through hole (the through hole 432A, the through hole 432B) is positioned in the laterally recessed portion for receiving part of the disk 432, the hydrogen generation material 421 filled in the through hole (the through hole 432A, the through hole 432B) falls under its own weight through the material supply hole 423 and the material receiving hole 417 into the aqueous solution 411 from the upper space US side, and is thereby fed (supplied) to the aqueous solution 411.

The hydrogen generator W40 may be provided with a material push mechanism that inserts a rod-shaped member into the through hole (the through hole 432A, the through hole 432B) located directly above the material supply hole 423 and the material receiving hole 417 to force the hydrogen generation material 421 out of the through hole (the through hole 432A, the through hole 432B). With this, the hydrogen generation material 421 can be reliably fed (supplied) to the aqueous solution 411.

In the case of using such a material push mechanism, the following operation is repeated: the rotation of the disk 432 is stopped when the through hole (the through hole 432A, the through hole 432B) is positioned directly above the material supply hole 423 and the material receiving hole 417, a rod-shaped member is inserted into the through hole (the through hole 432A, the through hole 432B) to push (supply) the hydrogen generation material 421 toward the aqueous solution 411, then the rod-shaped member is taken out of the through hole (the through hole 432A, the through hole 432B), and the disk 432 is rotated again.

In the embodiment, as described above, a pair of through holes (the through hole 432A, the through hole 432B) are formed to face each other across the rotation center O in positions at substantially the same distance from the rotation center O. However, it is not so limited.

For example, in positions at substantially the same distance from the rotation center O, three through holes of the same size may be arranged at equal intervals in the rotation direction of the disk 432 (in this case, the angle (pitch) between adjacent through holes is 120° as viewed in the circumferential direction of the disk 432), or four through holes may be arranged at equal intervals in the rotation direction (in this case, the angle (pitch) between adjacent through holes is 90° as viewed in the circumferential direction of the disk 432).

Meanwhile, it is not a problem even if there is only one through hole. The hydrogen generation material 421 can be supplied to the aqueous solution 411 by a control to position the through hole alternately in the laterally recessed portion for receiving part of the disk 432 and another place.

Note that if the number of through holes increases, it becomes difficult to form the laterally recessed portion for receiving part of the disk 432. Therefore, the number of through holes is preferably up to 4.

The through hole may have a size selected to allow the supply of the hydrogen generation material 421 according to the amount of hydrogen to be generated.

For example, the mass of magnesium hydride (weight per 1 mol) is 26.32 g/mol, and the density of magnesium hydride is about 2.36 g/cm$^3$. Therefore, when the hydrogen generation material 421 consisting of magnesium hydride having a volume of nearly 11.2 cm$^3$ (about 1 mol) is put into the aqueous solution 411, almost 45 liters (about 2 mol) of hydrogen is generated in the standard state.

Considering that the hydrogen gas turbine power generation device GNT that generates power of about 10 MW uses about 0.06 billion m$^3$/year of hydrogen, about 114 m$^3$ of hydrogen is required per minute. As an example, the through hole corresponding to this is as follows.

Assuming dimensions where, for example, the disk 432 has a thickness of about 10 cm and a diameter of about 70 cm, and the through hole with a diameter of about 21 cm is formed such that its inner end is located at a position offset by about 10 cm from the rotation center O (the center of the through hole is offset by about 20.5 cm from the rotation center O), the volume of the through hole is nearly 3346 cm$^3$.

Therefore, the through hole having the above dimension can be filled with about 300 mol (=3346 [cm$^3$]/11.2 [cm$^3$]) of the hydrogen generation material 421. When this amount of the hydrogen generation material 421 consisting of magnesium hydride is put into the aqueous solution 411, about 600 mol (about 13.4 m$^3$) of hydrogen is generated.

In the case where the disk 432 has two through holes such as the through hole 432A and the through hole 432B of the embodiment, the hydrogen generation material 421 is supplied from the through holes to the aqueous solution 411 twice per rotation (once from the through hole 432A and once from the through hole 432B).

For example, when the disk 432 rotates once every 12 seconds (5 rotations per minute), the hydrogen generation material 421 is supplied to the aqueous solution 411 10 times per minute.

Thus, it is possible to supply the hydrogen generation material 421 sufficient to generate more than 114 m$^3$ of hydrogen (about 134 m$^3$) per minute.

Therefore, in the case of a small-sized hydrogen gas turbine power generation device GNT (about 10,000 KW), if the disk 432 is provided with two through holes, the required volume of the through holes may be less than 3346 cm$^3$.

However, if the power generation device GNT has a larger electricity-generating capacity, it needs more supply of the hydrogen generation material 421. Therefore, assuming the power generation device GNT with an electricity-generating capacity of about 10 times, the through holes have preferably a volume of nearly 33460 cm$^3$.

Accordingly, it is preferable that the volume of the through holes be set to about 3000 cm$^3$ to 35000 cm$^3$.

Considering this, it is preferable that the material supply mechanism 430 be capable of feeding (supplying) the aqueous solution 411 with the hydrogen generation material 421 sufficient to generate about 100 $m^3$ to 1000 $m^3$ of hydrogen per minute.

Note that the material supply mechanism 430 described above is only an example. The material supply mechanism 430 can be configured otherwise as long as it is arranged so that the hydrogen generation material 421 can be supplied to the aqueous solution 411 from the upper space US side, and configured to be able to supply the hydrogen generation material 421 to the aqueous solution 411 from the upper space US side.

In the embodiment, the control unit (not illustrated) drives the motor 431 of the material supply mechanism 430 based on the measurement result obtained by the pressure measuring device 452 that measures the pressure in the upper space US of the solution storage 410 to control the amount of the hydrogen generation material 421 fed (supplied) to the aqueous solution 411 so that the pressure in the upper space US is set to the predetermined first pressure (required primary pressure).

In this manner, the control unit (not illustrated) controls the amount of the hydrogen generation material 421 fed (supplied) to the aqueous solution 411. Thus, the control unit (not illustrated) can figure out the amount of the hydrogen generation material 421 that has been supplied to the aqueous solution 411.

Accordingly, the control unit can predict an increase in the concentration of the by-product such as magnesium hydroxide contained in the aqueous solution 411 based on the total amount of the hydrogen generation material 421 supplied to the aqueous solution 411 (e.g., the prediction may be made based on data on concentration changes experimentally collected).

Note that, instead of such an experimental method, an increase in the content concentration of the by-product can be predicted by a theoretical calculation.

As described above, the control unit (not illustrated) controls the drainage control valve 415B and the supply control valve 416B based on the amount of the hydrogen generation material 421 fed (supplied) to the aqueous solution 411. Thereby, in this embodiment, the control unit controls the concentration of the by-product contained in the aqueous solution 411 not to become excessively high so that the reaction efficiency between the hydrogen generation material 421 and the aqueous solution 411 does not decrease.

As illustrated in FIG. 3, the solution storage 410 has a hydrogen discharge port 418 to discharge hydrogen in the upper space US toward the power generator PG (more specifically, the power generation device GNT (not illustrated)) of the power generation system PGS (see FIG. 1). Meanwhile, the power generation system PGS includes a hydrogen supply unit S70 (also referred to as "hydrogen supply pipe") that is connected to the hydrogen discharge port 418 and supplies hydrogen generated in the solution storage 410 to the power generation device GNT (not illustrated).

The power generation system PGS also includes a solenoid valve S71 that is located in a position near the hydrogen discharge port 418 on the hydrogen supply unit S70 to control whether or not to discharge hydrogen from the hydrogen discharge port 418, a pressure reducing valve S72 that is located farther from the hydrogen discharge port 418 than the solenoid valve S71 on the hydrogen supply unit S70, and a solenoid valve S73 that is located farther from the hydrogen discharge port 418 than the pressure reducing valve S72 on the hydrogen supply unit S70.

The pressure reducing valve S72 is intended to reduce the pressure of hydrogen from the predetermined first pressure (required primary pressure) in the upper space US to a predetermined second pressure (required secondary pressure) for supplying hydrogen to the power generator PG (more specifically, the power generation device GNT (not illustrated)) of the power generation system PGS.

The power generation system PGS further includes a buffer mechanism BF that stores hydrogen available to be supplied to the power generator PG (more specifically, the power generation device GNT (not illustrated)) of the power generation system PGS.

Specifically, the buffer mechanism BF includes a buffer tank B80, a draw-in branch line B81 (also referred to as "branch pipe") one end of which is connected to a position between the pressure reducing valve S72 and the solenoid valve S73 of the hydrogen supply unit S70 and the other end is connected to the buffer tank B80 to draw hydrogen into the buffer tank B80, a booster B82 located on the draw-in branch line B81, and a solenoid valve B83 located between the booster B82 and the buffer tank B80 on the draw-in branch line B81.

The buffer mechanism BF further includes a return line B84 (also referred to as "return pipe") one end of which is connected to the buffer tank B80 and the other end is connected to a position on the hydrogen supply unit S70 closer to the power generator PG (more specifically, the power generation device GNT (not illustrated)) of the power generation system PGS than the solenoid valve S73 to return hydrogen from the buffer tank B80 to the hydrogen supply unit S70, a solenoid valve B85 located on the return line B84, and a pressure reducing valve B86 located between the solenoid valve B85 and the hydrogen supply unit S70 on the return line B84.

Similarly to the pressure reducing valve S72, the pressure reducing valve B86 is intended to reduce the pressure of hydrogen from the pressure in the buffer tank B80 (described later) to the predetermined second pressure (required secondary pressure) for supplying hydrogen to the power generator PG (more specifically, the power generation device GNT (not illustrated)) of the power generation system PGS.

The buffer mechanism BF is filled with hydrogen when there is no demand for the supply of hydrogen from the power generator PG (more specifically, the power generation device GNT (not illustrated)) of the power generation system PGS.

Specifically, the control unit (not illustrated) controls the solenoid valve S71 and the solenoid valve B83 to open, and the solenoid valve S73 and the solenoid valve B85 to close. In addition, the control unit controls the drive of the booster B82 as well as controlling the hydrogen generator W40 to generate hydrogen.

Accordingly, the hydrogen generated in the hydrogen generator W40 is supplied to the draw-in branch line B81 at the predetermined second pressure (required secondary pressure) by virtue of the pressure reducing valve S72. However, since the pressure is increased by the booster B82, the buffer tank B80 can be filled with hydrogen such that the pressure in the buffer tank B80 becomes the same as the predetermined first pressure (required primary pressure) in the upper space US or a predetermined third pressure higher than the first pressure.

The buffer mechanism BF includes a pressure measuring device B87 (e.g., a digital manostar gauge) that measures the pressure inside the buffer tank B80.

The above process of filling the buffer tank B80 with hydrogen is performed based on the pressure in the buffer tank B80 measured by the pressure measuring device B87 such that the pressure becomes the first pressure or the predetermined third pressure higher than the first pressure.

For example, when the measured pressure becomes the target pressure, the drive of the hydrogen generator W40 is stopped, and the solenoid valves S71 and B83 are closed.

The buffer mechanism BF further includes a connection line B88 (also referred to as "connection pipe") that connects the buffer tank B80 and the emergency exhaust line 450, and a solenoid valve B89 that is arranged on the connection line B88 to control whether or not to perform emergency exhaust.

When the pressure measuring device B87 measures the pressure in the buffer tank B80 and the measurement result indicates an abnormally high pressure, the control unit (not illustrated) opens the solenoid valve B89 to perform step-down control so that the pressure in the buffer tank B80 becomes the aforementioned first pressure or the predetermined third pressure higher than the first pressure.

Although, in the embodiment, the buffer mechanism BF is described as being branched from the hydrogen supply unit S70, it may be arranged on the hydrogen supply unit S70.

For example, as a modification of the buffer mechanism BF, without the solenoid valve S71, only the buffer tank B80 may be arranged closer to the solution storage 410 than the solenoid valve S73 on the hydrogen supply unit S70, and the pressure reducing valve S72 may be arranged closer to the power generator PG (more specifically, the power generation device GNT (not illustrated)) of the power generation system PGS than the solenoid valve S73 on the hydrogen supply unit S70.

In this case, hydrogen generated in the solution storage 410 is always supplied to the power generator PG (more specifically, the power generation device GNT (not illustrated)) of the power generation system PGS through the buffer mechanism BF.

In this modification of the buffer mechanism BF, the pressure in the buffer tank B80 is the same as the pressure in the solution storage 410. Therefore, emergency exhaust may be performed with the same configuration for emergency exhaust as in the solution storage 410 described above.

Besides, the control of the buffer mechanism BF may be presumably simpler if it is performed by the control unit of the hydrogen generator W40. Therefore, the hydrogen generator W40 may include the buffer mechanism BF, and part of the hydrogen supply unit S70 required in relation to the buffer mechanism BF.

Next, the operation of the power generation system PGS configured as above will be described.

Since the detailed operation can be fully understood from the above description, only the main operation will be described below.

In the following description, it is assumed that the buffer tank B80 is already filled with hydrogen.

For example, when the hydrogen generator W40 receives a request (command) to supply hydrogen from the power generator PG (more specifically, the power generation device GNT (not illustrated)) of the power generation system PGS, the control unit of the hydrogen generator W40 checks the pressure in the upper space US of the solution storage 410.

Then, if the pressure in the upper space US is around the predetermined first pressure (required primary pressure), the control unit opens the solenoid valves S71 and S73 to start the supply of hydrogen to the power generator PG (more specifically, the power generation device GNT (not illustrated)) of the power generation system PGS. The control unit also controls the drive of the material supply mechanism 430 to maintain the pressure in the upper space US of the solution storage 410, which is reduced by the supply of hydrogen, at the predetermined first pressure (required primary pressure).

On the other hand, when the pressure is too low in the upper space US of the solution storage 410 as a result of checking it, the control unit of the hydrogen generator W40 opens the solenoid valve B85 to supply hydrogen in the buffer tank B80 to the power generator PG (more specifically, the power generation device GNT (not illustrated)) of the power generation system PGS. The control unit also controls the drive of the material supply mechanism 430 to set the pressure in the upper space US of the solution storage 410 to the predetermined first pressure (required primary pressure).

In this embodiment, the hydrogen generation material 421 is supplied to a large amount of the aqueous solution 411 stored in the solution storage 410. Therefore, even if the reaction between the hydrogen generation material 421 and the aqueous solution 411 produces a by-product such as magnesium hydroxide or the like, the by-product quickly diffuses into the aqueous solution 411.

For this reason, the reaction proceeds efficiently and promptly without being hindered. Thus, the pressure in the upper space US of the solution storage 410 can be set to the predetermined first pressure (required primary pressure) in a short time.

When the pressure in the upper space US of the solution storage 410 reaches the predetermined first pressure (required primary pressure), the control unit of the hydrogen generator W40 opens the solenoid valves S71 and S73, and closes the solenoid valve B85 to switch the supply source of hydrogen to the power generator PG (more specifically, the power generation device GNT (not illustrated)) of the power generation system PGS from the buffer tank B80 to the solution storage 410.

In the embodiment, the hydrogen generation material 421 and the aqueous solution 411 react efficiently as described above, which facilitates the control to suppress a decrease in the pressure in the upper space US of the solution storage 410 due to the supply of hydrogen to the power generator PG (more specifically, the power generation device GNT (not illustrated)) of the power generation system PGS.

Further, since the hydrogen generation material 421 is supplied to the aqueous solution 411 in an amount sufficient for a rapid reaction with the hydrogen generation material 421, the reaction is not hindered by by-products of the reaction. Thus, the high reaction efficiency can be sustained continuously.

If the pressure in the upper space US of the solution storage 410 is likely to drop to a level not suitable for the supply of hydrogen for some reason while supplying hydrogen from the solution storage 410 to the power generator PG (more specifically, the power generation device GNT (not illustrated)) of the power generation system PGS, the control unit of the hydrogen generator W40 closes the solenoid valve S71 and opens the solenoid valve B85 again.

In this manner, the control unit restores the pressure in the upper space US of the solution storage 410 without stopping the supply of hydrogen to the power generator PG (more specifically, the power generation device GNT (not illustrated)) of the power generation system PGS.

Upon receipt of a request (command) to stop the supply of hydrogen from the power generator PG (more specifically, the power generation device GNT (not illustrated)) of the power generation system PGS, the control unit of the hydrogen generator W40 checks the pressure in the buffer tank B80 before stopping the operation of the hydrogen generator W40. If the buffer tank B80 needs to be refilled with hydrogen, the control unit refills it with hydrogen, and then stops the operation of the hydrogen generator W40.

On the other hand, when the buffer tank B80 does not need to be filled with hydrogen, the control unit of the hydrogen generator W40 stops the operation of the hydrogen generator W40 without refilling it with hydrogen.

In the embodiment, the presence of the buffer mechanism BF further increases the promptness in the supply of hydrogen at the start of supplying hydrogen to the power generator PG (more specifically, the power generation device GNT (not illustrated)) of the power generation system PGS and the stability in the supply amount of hydrogen during the supply of hydrogen.

However, in the embodiment, the hydrogen generation material 421 is supplied to a large amount of the aqueous solution 411 stored in the solution storage 410 as described above.

Due to this, the hydrogen generation material 421 and the aqueous solution 411 react with high efficiency, which facilitates the generation of the required amount of hydrogen at the start of supplying hydrogen to the power generator PG (more specifically, the power generation device GNT (not illustrated)) of the power generation system PGS as well as achieving high controllability on the supply amount of hydrogen during the supply of hydrogen.

Therefore, in this embodiment, the buffer mechanism BF need not necessarily be required, and the buffer mechanism BF may be omitted.

(By-Product Acquisition Unit W10)

Figure 4:
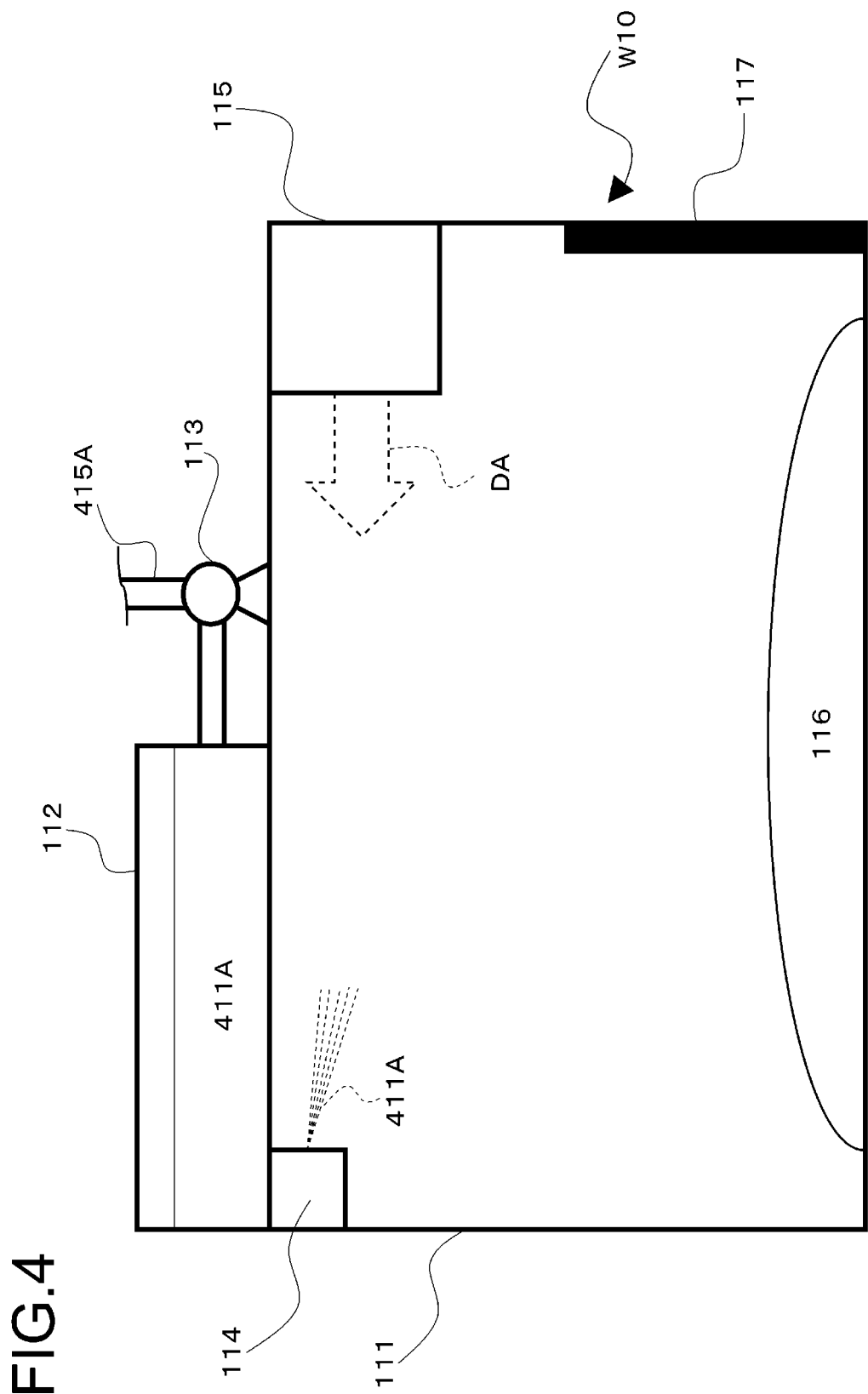
FIG. 4 is a diagram for explaining a by-product acquisition unit according to an embodiment.

FIG. 4 is a diagram for explaining the by-product acquisition unit W10.

As described above, the drainage from the hydrogen generator W40 contains a high concentration of the by-product 116 including more than one type of oxygen-containing magnesium compound (mainly magnesium hydroxide) that contains oxygen produced by the reaction between the hydrogen generation material 421 and the aqueous solution 411 (solution).

The by-product acquisition unit W10 is a component that separates/extracts the by-product 116 from the drainage (the post-reaction aqueous solution 411A), i.e., the solution after reacting with the hydrogen generation material 421 containing a hydrogen-containing magnesium compound that generates hydrogen via a reaction with the aqueous solution 411 (solution), to thereby acquire the by-product 116.

Specifically, the by-product acquisition unit W10 includes a drying chamber 111, a post-reaction solution storage 112 that is arranged on the drying chamber 111 to store the post-reaction aqueous solution 411A which is the solution after the reaction, a pump 113 that is connected to the drainage line 415A to fill the post-reaction solution storage 112 with the post-reaction aqueous solution 411A, a sprayer 114 that is arranged at an upper position in the drying chamber 111 to spray the post-reaction aqueous solution 411A stored in the post-reaction solution storage 112 in the form of a fine mist in the drying chamber 111, and a blower 115 that blows a dry gas DA with low humidity toward the post-reaction aqueous solution 411A in the form of a mist sprayed by the sprayer 114.

The blower 115 includes, for example, a dehydration unit that takes in a gas (e.g., air) in the drying chamber 111 to remove moisture from the gas, a heater that heats the gas dehydrated by the dehydration unit and having a low humidity, and a blower that sends the heated dry gas DA into the drying chamber 111.

Specifically, the dehydration unit dehydrates the gas taken in from the drying chamber 111 such that its humidity is reduced to less than 20%. The heating unit heats the gas with a humidity of less than 20% to, for example, about 50° C. The blower blows the dry gas DA with a humidity of less than 20% and a temperature of about 50° C. toward the post-reaction aqueous solution 411A sprayed by the sprayer 114.

Note that the gas taken in from the drying chamber 111 is dehydrated by the dehydration unit to have a humidity of preferably less than 10%, and more preferably less than 5%.

Accordingly, when the post-reaction aqueous solution 411A is sprayed from the sprayer 114, moisture in the sprayed post-reaction aqueous solution 411A evaporates before reaching the floor of the drying chamber 111. As a result, the by-product 116 in the post-reaction aqueous solution 411A that does not evaporate is deposited on the floor of the drying chamber 111.

Even if the by-product 116 deposited on the floor contains a small amount of moisture, the moisture also evaporates as the humidity is low in the drying chamber 111.

In this manner, the by-product acquisition unit W10 separates/extracts the by-product 116 from the post-reaction aqueous solution 411A, thereby acquiring the by-product 116.

However, the configuration described above is only an example of the by-product acquisition unit W10, and the by-product 116 can be separated/extracted from the post-reaction aqueous solution 411A using a filtration filter or the like.

In this case, however, the by-product 116 is not in a dry state, so that a drying process is further required. Therefore, the above configuration is preferable for the by-product acquisition unit W10.

Besides, the by-product acquisition unit W10 may also be configured to heat the post-reaction aqueous solution 411A to evaporate the moisture. In this case, however, a large amount of electricity is required for heating, and it takes a long time before the moisture evaporates.

On the other hand, in the case of the above configuration, electricity is mainly required in a compressor used to reduce the humidity of the gas and the heater necessary for heating the dry gas to about 50° C. Thus, less electricity is needed as compared to the case where the post-reaction aqueous solution 411A itself is heated to evaporate the moisture, and it takes less time to obtain the by-product 116. Therefore, it is preferred to use the configuration described with reference to FIG. 4.

The by-product acquisition unit W10 includes a door 117 arranged on the drying chamber 111. The by-product 116 is taken out through the door 117, and conveyed to the raw material production unit W20.

(Raw Material Production Unit W20)

Figure 5:
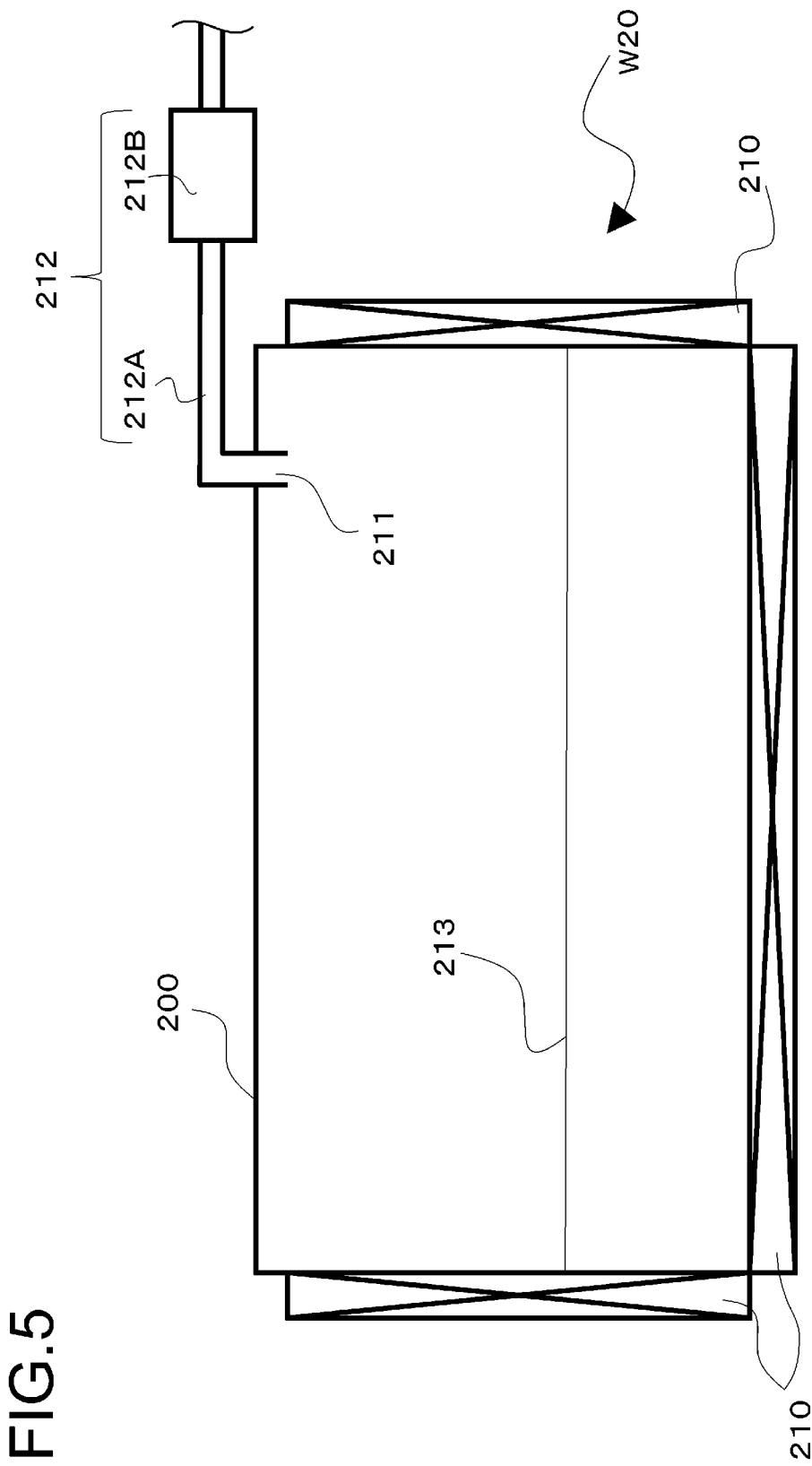
FIG. 5 is a diagram for explaining a raw material production unit according to an embodiment.

FIG. 5 is a diagram for explaining the raw material production unit W20.

The raw material production unit W20 includes a raw material production chamber 200, a heating unit 210 (e.g., a heater) that heats the inside of the raw material production chamber 200 to a predetermined temperature, and an exhaust mechanism 212 that exhausts gas from an exhaust port 211 of the raw material production chamber 200.

For example, the exhaust mechanism 212 includes an exhaust line 212A (also referred to as "exhaust pipe") connected to the exhaust port 211 of the raw material production chamber 200, and an exhaust pump 212B arranged on the exhaust line 212A.

A mixture 213 of the by-product 116 (the main component is magnesium hydroxide ($Mg(OH)_2$)) obtained in the by-product acquisition unit W10 and ammonium chloride ($NH_4Cl$) which is a halogen-containing substance containing halogen and other atoms than halogen is placed in the raw material production chamber 200, and the mixture 213 is heated to a predetermined temperature.

Specifically, the mixture 213 is heated to a temperature in the range of 340° C. to 450° C. at which ammonium chloride ($NH_4Cl$), which is a halogen-containing substance, decomposes into ammonia ($NH_3$) and hydrochloric acid (HCl) and reacts with the by-product 116, thereby producing magnesium halide (in this example, $MgCl_2$).

Incidentally, it is more preferable to heat the mixture 213 to a temperature in the range of 340° C. to 400° C. In this case, the time required for the treatment may be about 2 hours, and the treatment can be performed with relatively low power consumption by increasing the heat retention in the raw material production chamber 200.

In this reaction, gaseous ammonia and water vapor are produced as represented by the following Formula 5. They are exhausted out of the raw material production chamber 200 by the exhaust mechanism 212, and a raw material containing produced magnesium halide (in this example, the main component is magnesium chloride) remains in the raw material production chamber 200.

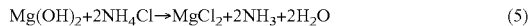

$$Mg(OH)_2 + 2NH_4Cl \rightarrow MgCl_2 + 2NH_3 + 2H_2O \quad (5)$$

As mentioned above, the by-product 116 may contain magnesium oxide (MgO). However, it is not a problem even if it contains magnesium oxide since it has been confirmed that ammonium chloride can convert magnesium oxide into magnesium chloride.

In the chemical formula, as represented by Formula 5, 2 mol of ammonium chloride reacts with 1 mol of magnesium hydroxide.

In this case, when the reaction represented by Formula 5 is viewed in terms of weight ratio, the content of ammonium chloride in the mixture 213 can be about 1.8 times that of the by-product 116 by weight. However, since not all the ammonium chloride contributes to the reaction, the mixture 213 preferably contains twice as much or more ammonium chloride as the by-product 116 by weight, and more preferably three times as much or more ammonium chloride as the by-product 116 by weight.

Note that if the mixture 213 contains too much ammonium chloride, it takes a long time to decompose and remove the ammonium chloride. Therefore, the content of ammonium chloride in the mixture 213 is preferably up to 10 times that of the by-product 116 by weight, and more preferably up to 8 times that of the by-product 116 by weight.

In addition, magnesium hydroxide or magnesium oxide can also be converted to magnesium chloride when the by-product 116 is heated at a temperature in the range of about 340° C. to 450° C. in a gaseous hydrochloric acid atmosphere. Therefore, instead of the above configuration, gaseous hydrochloric acid (hydrogen chloride) may be supplied to the raw material production chamber 200.

The raw material production unit W20 may be provided with a stirring mechanism (e.g., a propeller for stirring) to stir the mixture 213 in the raw material production chamber 200.

Further, the exhaust mechanism 212 does not need to exhaust gas constantly. For example, there may be provided a pressure measuring device to measure the pressure in the raw material production chamber 200, and control may be performed to repeat the process of checking the pressure that rises along with the decomposition of ammonium chloride and reducing the pressure to a value set in advance when it rises above a predetermined value.

Incidentally, as can be seen from Formula 5, the exhaust gas from the raw material production unit W20 contains gaseous ammonia and water vapor.

For example, a mechanism (e.g., a molecular sieve) that removes water vapor may be provided upstream of the exhaust pump 212B (on the raw material production chamber 200 side) to introduce gaseous hydrochloric acid to the downstream of the exhaust pump 212B (on the side away from the raw material production chamber 200). With this, ammonia reacts with hydrochloric acid to form a powder of ammonium chloride, and the ammonium chloride can be obtained by using a dust collector in the downstream of the position where the hydrochloric acid is introduced.

Therefore, by recovering ammonia as ammonium chloride without exhausting it, the ammonia can be recycled in the raw material production unit W20.

Besides, ammonia may be recovered from the exhaust gas of the raw material production unit W20 and added to the exhaust gas of the hydrogen generation material production unit W30 described above so that it reacts with hydrochloric acid in the exhaust gas of the hydrogen generation material production unit W30 to form ammonium chloride.

In this case, the hydrochloric acid in the exhaust gas of the hydrogen generation material production unit W30 changes into solid ammonium chloride, and the gas volume decreases in the exhaust gas. Accordingly, a pump used in the hydrogen generation material production unit W30 requires less exhaust capacity as described later.

The raw material containing magnesium halide (in this example, the raw material mainly contains magnesium chloride) thus produced in the raw material production unit W20 is taken out from the raw material production chamber 200 through a door (not illustrated) provided therein, and conveyed to the hydrogen generation material production unit W30 described above. The raw material is reduced by hydrogen contained in plasma in the hydrogen generation material production unit W30 to form the hydrogen generation material 421 again.

As described above, according to the embodiment, the hydrogen generation system W1 is a magnesium-recycling hydrogen generation system which recycles magnesium instead of disposing of it. In addition, the hydrogen generator W40 is configured to feed the hydrogen generation material 421 to a large amount of solution (the aqueous solution 411). Thus, it is possible to prevent a decrease in hydrogen generation amount.

Further, in the hydrogen generator W40, hydrogen can be generated by the reaction of the hydrogen generation material 421 with the aqueous solution 411, and it only requires an amount of electricity necessary to drive the valves and the like. As a result, the electricity used in the by-product acquisition unit W10 and the raw material production unit W20 can be suppressed to a low level. Thus, it may be possible to reduce the energy required to produce the raw material for producing the hydrogen generation material 421 as a whole.

While preferred embodiments have been and described, the disclosure is not limited to these embodiments. As will be appreciated, elements described in the embodiments herein can be added, exchanged, combined, and/or eliminated so as to provide a number of additional embodiments of the present disclosure.

For example, the above Formulas 1 to 4 represent reactions that occur in the hydrogen generator W40. As can be seen from Formulas 1 to 4, these are exothermic reactions.

Therefore, the aqueous solution 411 (solution) absorbs heat and becomes hot. This heat may be used to further generate electricity.

Specifically, the power generation system PGS described above may further include a thermoelectric generator (e.g., a steam turbine, etc.) that generates electricity using heat, and may be configured to generate electricity also in the thermoelectric generator using heat generated when the hydrogen generation material 421 and the solution (the aqueous solution 411) react in the hydrogen generator W40.

Figure 6:
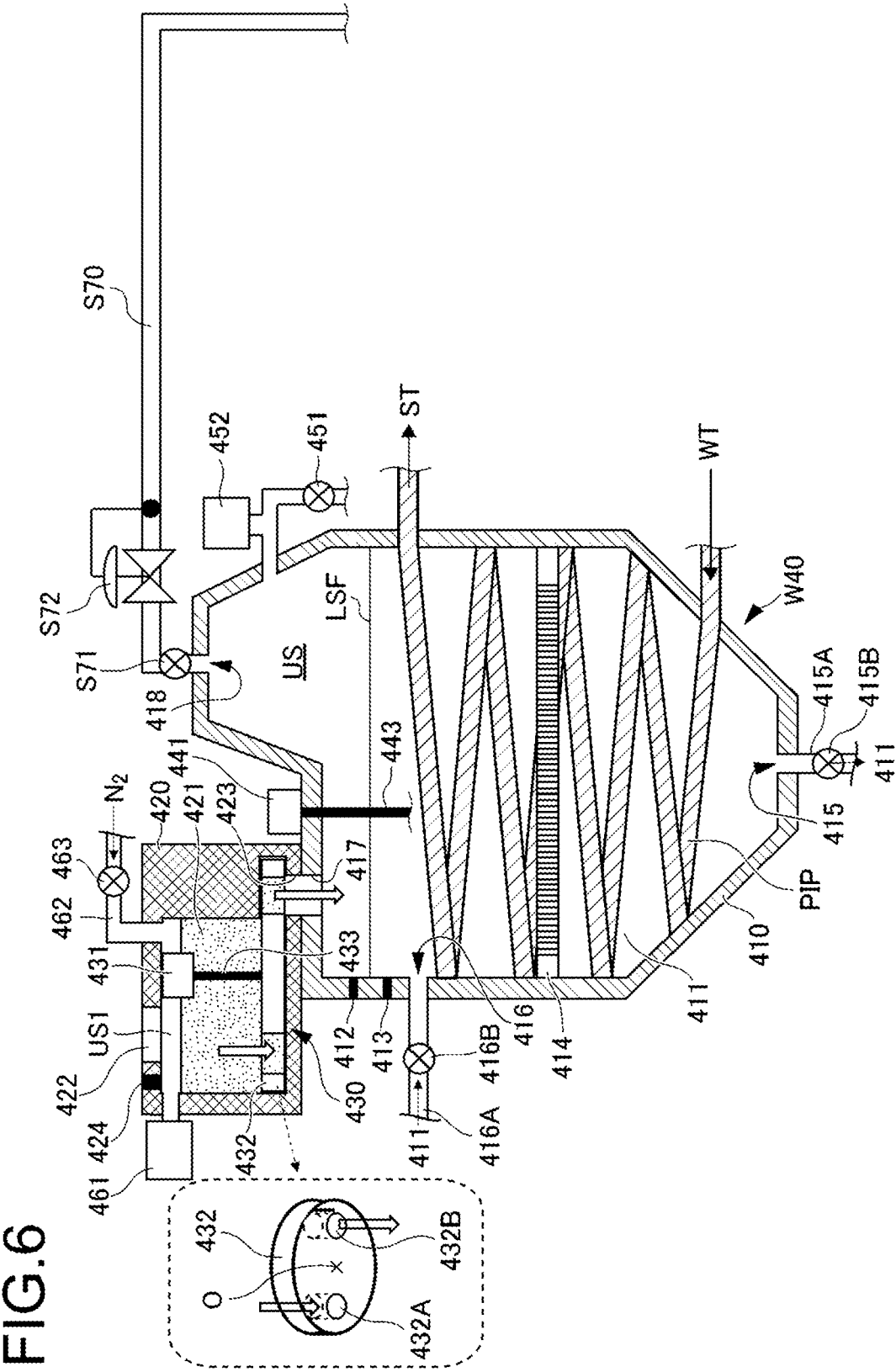
FIG. 6 is a diagram for explaining a modification of the power generation system that further include a thermoelectric generator according to an embodiment.

FIG. 6 is a diagram for explaining a modification of the power generation system PGS that further includes a thermoelectric generator. Although some illustrations and reference numerals are omitted, FIG. 6 basically corresponds to FIG. 3.

Since the thermoelectric generator (a steam turbine, etc.) may have a general structure such as including a steam turbine that generates electricity with steam ST and a condenser that converts the steam ST that has driven the steam turbine back to water WT, the illustration is omitted.

When electricity is also generated by the additional thermoelectric generator, as illustrated in FIG. 6, the solution storage 410 may be provided with a pipe PIP that is arranged, for example, spirally from bottom to top along the inner wall to receive the water WT from the condenser of the thermoelectric generator (a steam turbine, etc.) and, after turning the water WT into the steam ST by the heat of the solution (the aqueous solution 411), send it to the thermoelectric generator.

As described above, the upper space US in the solution storage 410 is maintained at the predetermined first pressure and has a pressure higher than the atmospheric pressure. Accordingly, the water boils in the pipe PIP being at about the atmospheric pressure, and the steam ST moves toward the thermoelectric generator, thereby driving the thermoelectric generator (a steam turbine, etc.) to generate electricity.

In this case, the solution (the aqueous solution 411) in the solution storage 410 is cooled, which also achieves the effect of suppressing the evaporation of the solution.

With this configuration of the modification, electricity is produced not only by hydrogen power generation but also by thermoelectric generation, resulting in a further increase in the power generation amount.

While, in the above embodiment, magnesium chloride and magnesium fluoride are cited as examples of the raw material that is reduced by hydrogen contained in plasma, the raw material is not so limited and may be, for example, magnesium iodide or the like.

It is also possible in this case to generate the hydrogen generation material 421 containing a hydrogen-containing magnesium compound (specifically, magnesium hydride) that generates hydrogen via a reaction with the solution using plasma containing hydrogen.

As magnesium hydroxide is obtained as the by-product 116, the raw material can be regenerated by reacting the by-product 116 with hydrogen iodide or ammonium iodide as a halogen-containing substance containing halogen and other atoms than halogen in the raw material production unit W20.

When the raw material is magnesium fluoride, the by-product 116 can be reacted with hydrogen fluoride or ammonium fluoride to regenerate the raw material. When the raw material is magnesium bromide, the by-product 116 can be reacted with hydrogen bromide or ammonium bromide to regenerate the raw material.

That is, the raw material contains magnesium halide as a main component, and an ammonium salt containing halogen or hydrogen halide can be used as the halogen-containing substance to be reacted with the by-product 116 to regenerate the raw material.

Incidentally, as described above, the hydrogen generation material production unit W30 includes the treatment chamber 301 in which the raw material (e.g., a raw material containing magnesium halide such as magnesium chloride) is reduced by hydrogen contained in plasma to produce the hydrogen generation material 421, and the decompressor 330 (the first vacuum pump 332 and the second vacuum pump 334) that discharges the gas from the treatment chamber 301 to decompress the inside of the treatment chamber 301. The gas discharged from the treatment chamber 301 contains hydrogen halide (for example, hydrogen chloride) produced during the reduction.

Ammonia reacts with a hydrogen halide such as hydrogen chloride at room temperature to form an ammonium salt containing the halogen, and the ammonium salt containing halogen turns into a solid state at room temperature.

For this reason, as mentioned earlier, the hydrogen generation material production unit W30 preferably includes an ammonia supply unit to supply ammonia to the gas which has been discharged from the treatment chamber 301 and is on its way to the decompressor 330 (the first vacuum pump 332 and the second vacuum pump 334).

In this case, hydrogen halide (e.g., hydrogen chloride) in the exhaust gas reacts with ammonia to produce an ammonium salt (e.g., ammonium chloride) containing solid halogen. As the gas changes its state to solid, the volume is greatly reduced.

This facilitates the decompression in the treatment chamber 301.

Thus, the configuration including such an ammonia supply unit enables a reduction in the required capacity of the decompressor 330 (the first vacuum pump 332 and the second vacuum pump 334).

Moreover, as can be seen from the above Formula 5, in the raw material production unit W20, ammonia is produced as a by-product through the reaction between the ammonium salt containing halogen and the by-product 116. The ammonia supply unit can supply the ammonia obtained in the process of producing the raw material in the raw material production unit W20.

For example, the ammonia supply unit may include a tank that stores the ammonia generated in the process of producing the raw material in the raw material production unit W20, an ammonia supply pipe that is connected to the tank as well as to an exhaust pipe extending between the treatment chamber 301 and the decompressor 330 (the first vacuum pump 332 and the second vacuum pump 334), and a flow rate controller that is arranged on the ammonia supply pipe to control the flow rate of the ammonia.

Furthermore, an ammonium salt (e.g., ammonium chloride) containing solid halogen produced by the reaction between ammonia and hydrogen halide (e.g., hydrogen chloride) in the exhaust gas can be used in the raw material production unit W20.

When the hydrogen generation material production unit W30 includes an ammonium salt acquisition unit to acquire an ammonium salt containing halogen produced by the reaction between ammonia and hydrogen halide in the gas discharged from the treatment chamber 301, the ammonium salt acquired by the ammonium salt acquisition unit is utilized as the halogen-containing substance used in the raw material production unit W20.

The ammonium salt moves toward the decompressor 330 (the first vacuum pump 332 and the second vacuum pump 334) in a solid state. Therefore, for example, a dust collector as the ammonium salt acquisition unit may be arranged upstream (the treatment chamber 301 side) or downstream of the decompressor 330 (the first vacuum pump 332 and the second vacuum pump 334).

As described above, the by-product (magnesium hydroxide, magnesium oxide) acquired by the by-product acquisition unit W10 can be converted to magnesium chloride by a reaction with gaseous hydrochloric acid (hydrogen chloride).

In the hydrogen generation material production unit W30, hydrogen halide (e.g., hydrogen chloride) is produced as a result of the reduction reaction.

For example, a hydrogen halide acquisition unit that separates and acquires hydrogen halide (e.g., hydrogen chloride) in gaseous form may be arranged upstream (the treatment chamber 301 side) or downstream of the decompressor 330 (the first vacuum pump 332 and the second vacuum pump 334) of the hydrogen generation material production unit W30.

The hydrogen halide (e.g., hydrogen chloride) may be used in the raw material production unit W20.

For example, the hydrogen halide acquisition unit may use a separation membrane or the like for separating hydrogen halide (e.g., hydrogen chloride).

In the above embodiment, an example is described in which the entire power generation system PGS of the embodiment is provided as annexed to a solar or wind power generator or the like. However, among the elements of the hydrogen generation system W1, the by-product acquisition unit W10, the raw material production unit W20, and the hydrogen generation material production unit W30 may be arranged around a solar or wind power generator or the like, while the hydrogen generation unit W40 may be arranged near the power generator PG located in a rural area.

With this configuration, power generation is performed at the location where the electricity is consumed. Accordingly, transmission loss can be reduced. Furthermore, although in recent years it has become a problem that power failure occurs over a wide area when a large power plant shuts down, this problem can also be avoided.

Although the above description has been given mainly of the case where magnesium hydride is predominantly produced from magnesium chloride in the hydrogen generation material production unit W30, reduction may be performed to produce metallic magnesium predominantly from magnesium chloride by adjusting the temperature of the surface 381 of the attachment member 380 or the like. The metallic magnesium thus produced can be used for reduction to produce magnesium hydride.

In other words, the hydrogen generation material production unit W30, which produces a hydrogen generation material by reducing a raw material with hydrogen contained in plasma, may produce the hydrogen generation material by performing the following two steps: reductive dehalogenation to remove halogen from magnesium halide (e.g., magnesium chloride), and hydrogenation/reduction to add hydrogen to metallic magnesium from which halogen has been removed.

While certain embodiments of the invention have been described, it is to be understood that the invention is not to be limited to the disclosed embodiments. As would be apparent to those skilled in the art, various changes, modifications, and alterations may be made within the scope of the invention as defined in the appended claims.

What is claimed is:

1. A hydrogen generation system configured as a magnesium-recycling hydrogen generation system, the hydrogen generation system comprising:
    a by-product acquisition unit configured to separate a by-product from a post-reaction solution, which is a solution after reacting with a hydrogen generation material containing a hydrogen-containing magnesium compound that generates hydrogen via a reaction with the solution, to acquire the by-product including more than one type of oxygen-containing magnesium compound that contains oxygen produced by the reaction;
    a raw material production unit configured to react the by-product with a halogen-containing substance containing halogen and other atoms than the halogen to produce a raw material containing magnesium halide;
    a hydrogen generation material production unit configured to reduce the raw material with plasma containing hydrogen to produce the hydrogen generation material; and
    a hydrogen generator configured to react the hydrogen generation material with the solution to generate hydrogen.

2. The hydrogen generation system according to claim 1, wherein
    the hydrogen-containing magnesium compound is magnesium hydride,
    the oxygen-containing magnesium compound is magnesium hydroxide or magnesium oxide, and
    the halogen-containing substance is an ammonium salt containing the halogen.

3. The hydrogen generation system according to claim 2, wherein the hydrogen generation material production unit includes
    a treatment chamber where the raw material is reduced with the plasma containing hydrogen to produce the hydrogen generation material,
    a decompressor configured to discharge gas from the treatment chamber to decompress the inside of the treatment chamber, and
    an ammonia supply unit configured to supply ammonia to the gas which has been discharged from the treatment chamber and is on its way to the decompressor.

4. The hydrogen generation system according to claim 3, wherein the ammonia supply unit is further configured to supply ammonia generated when the raw material is produced in the raw material production unit.

5. The hydrogen generation system according to claim 3, wherein
    the hydrogen generation material production unit further includes an ammonium salt acquisition unit configured to acquire an ammonium salt containing the halogen produced by a reaction between the ammonia and hydrogen halide in the gas discharged from the treatment chamber, and the ammonium salt acquired by the ammonium salt acquisition unit is utilized as the halogen-containing substance used in the raw material production unit.

6. The hydrogen generation system according to claim 1, wherein the hydrogen-containing magnesium compound is magnesium hydride, the oxygen-containing magnesium compound is magnesium hydroxide or magnesium oxide, and the halogen-containing substance is a hydrogen halide.

7. The hydrogen generation system according to claim 6, wherein the hydrogen generation material production unit includes a hydrogen halide acquisition unit configured to acquire a hydrogen halide produced by a reduction reaction in gaseous form, and the hydrogen halide acquired by the hydrogen halide acquisition unit is used in the raw material production unit.

8. The hydrogen generation system according to claim 1, wherein the hydrogen generator includes a reaction unit configured to store the solution and perform the reaction to generate hydrogen, and a material storage configured to store the hydrogen generation material to be supplied to the reaction unit.

9. A power generation system comprising a power generator configured to generate electricity using hydrogen, wherein the power generator is supplied with hydrogen generated by the hydrogen generation system according to claim 1.

10. The power generation system according to claim 9, comprising a thermoelectric generator configured to generate electricity using heat, wherein the thermoelectric generator is further configured to generate electricity using heat generated when the hydrogen generation material and the solution react in the hydrogen generator.

11. A hydrogen generation method, which is a magnesium-recycling hydrogen generation method, the hydrogen generation method comprising:

separating a by-product from a post-reaction solution, which is a solution after reacting with a hydrogen generation material containing a hydrogen-containing magnesium compound that generates hydrogen via a reaction with the solution, to acquire the by-product including more than one type of oxygen-containing magnesium compound that contains oxygen produced by the reaction;

reacting the by-product with a halogen-containing substance containing halogen and other atoms than the halogen to produce a raw material containing magnesium halide;

reducing the raw material with plasma containing hydrogen to produce the hydrogen generation material; and reacting the hydrogen generation material with the solution to generate hydrogen.

12. A power generation method to generate electricity using hydrogen, comprising:

generating electricity using hydrogen; and supplying hydrogen generated by the hydrogen generation method according to claim 11 for the generating electricity using hydrogen.

13. The power generation method according to claim 12, further comprising generating electricity using heat generated during the reacting the hydrogen generation material with the solution to generate hydrogen.

* * * * *